United States Patent
Avery

(10) Patent No.: US 10,624,328 B1
(45) Date of Patent: Apr. 21, 2020

(54) MARINE CONTAINMENT DEVICE

(71) Applicant: Matthew Avery, Parrish, FL (US)

(72) Inventor: Matthew Avery, Parrish, FL (US)

(*) Notice: Subject to any disclaimer, the term of this patent is extended or adjusted under 35 U.S.C. 154(b) by 343 days.

(21) Appl. No.: 15/435,597

(22) Filed: Feb. 17, 2017

Related U.S. Application Data

(60) Provisional application No. 62/296,787, filed on Feb. 18, 2016.

(51) Int. Cl.
*A01K 97/05* (2006.01)
*A01K 63/02* (2006.01)
*A01K 97/20* (2006.01)

(52) U.S. Cl.
CPC .............. *A01K 97/05* (2013.01); *A01K 63/02* (2013.01); *A01K 97/20* (2013.01)

(58) Field of Classification Search
CPC ................................ A01K 97/05; A01K 97/04
USPC ......................... 43/56, 55; 220/560
See application file for complete search history.

(56) References Cited

U.S. PATENT DOCUMENTS

| | | | | |
|---|---|---|---|---|
| 359,311 A * | 3/1887 | Bateman | .................. | A01K 97/05 43/56 |
| 367,056 A * | 7/1887 | Owsley | .................. | A01K 97/04 43/55 |
| 807,875 A * | 12/1905 | Shinners | .................. | A01K 97/05 43/56 |
| 986,229 A * | 3/1911 | Seeger | .................. | A01K 97/05 43/56 |
| 1,619,634 A * | 3/1927 | Roat | .................. | A01K 97/05 114/343 |
| 1,630,131 A * | 5/1927 | Messinger | .................. | A01K 97/05 43/56 |
| 1,731,191 A * | 10/1929 | De Roy | .................. | A01K 97/05 43/55 |
| 1,788,255 A * | 1/1931 | Thomas | .................. | A01K 97/05 43/55 |
| 2,111,959 A * | 3/1938 | Baxter | .................. | A01K 97/05 43/100 |
| 2,149,996 A * | 3/1939 | Gulden | .................. | A01K 97/05 43/56 |
| 2,657,496 A * | 11/1953 | Spotswood | .................. | A01K 97/05 43/55 |

(Continued)

FOREIGN PATENT DOCUMENTS

| | | | | |
|---|---|---|---|---|
| DE | 19952060 A1 * | 5/2001 | ............. | A01K 97/05 |
| KR | 100943960 B1 * | 2/2010 | | |

*Primary Examiner* — Darren W Ark
(74) *Attorney, Agent, or Firm* — Frijouf, Rust & Pyle, P.A.

(57) ABSTRACT

A marine containment device is disclosed for containing a marine species. The marine containment device comprises a container defining an interior chamber. An aperture is in the container for inputting and outputting the marine species relative to the interior chamber. A closure door closes the aperture. A hinge pivotably couples the closure door with the container. A first flotation body is coupled to the first side wall and a second flotation body is coupled to the second side wall for providing a positive buoyancy while holding a portion of the body of water and marine species within the chamber when the container defines a horizontal position within the body of water. The rear end defines a linear plane for positioning on the surface and maintaining the container in a vertical position while holding a portion of the body of water and marine species within the chamber.

6 Claims, 17 Drawing Sheets

(56) References Cited

U.S. PATENT DOCUMENTS

| | | | | |
|---|---|---|---|---|
| 2,791,061 | A * | 5/1957 | Moseley | A01K 97/05 43/56 |
| 2,834,145 | A * | 5/1958 | Kisiel | A01K 97/05 43/56 |
| 2,842,890 | A * | 7/1958 | Goroni | A01K 97/05 43/44.99 |
| 2,854,782 | A * | 10/1958 | Daugherty | A01K 97/05 43/55 |
| 3,009,281 | A * | 11/1961 | Unger | A01K 97/05 43/56 |
| 3,036,400 | A * | 5/1962 | Anderson | A01K 97/05 43/55 |
| 3,045,262 | A * | 7/1962 | Mitchell | B63C 11/46 43/55 |
| 3,304,645 | A * | 2/1967 | Hardesty | A01K 63/02 43/55 |
| 3,357,127 | A * | 12/1967 | Barradale | A01K 97/05 43/55 |
| 3,367,061 | A * | 2/1968 | Primmer | A01K 63/02 43/55 |
| 3,477,165 | A * | 11/1969 | Brancato | A01K 97/05 43/55 |
| 3,593,453 | A * | 7/1971 | Bishop | A01K 97/05 43/55 |
| 3,596,394 | A * | 8/1971 | Reeder | A01K 97/05 43/6.5 |
| 3,728,812 | A * | 4/1973 | Woolworth | A01K 97/05 43/55 |
| D226,849 | S | 5/1973 | Woolworth et al. | |
| 4,260,070 | A * | 4/1981 | Pierson | A01K 97/05 220/827 |
| 4,297,804 | A * | 11/1981 | Weld | A01K 97/05 43/55 |
| 4,554,757 | A * | 11/1985 | Sakuta, Jr. | A01K 97/05 43/55 |
| 4,603,503 | A * | 8/1986 | Haney | A01K 97/05 43/56 |
| 4,627,189 | A * | 12/1986 | Pippin | A01K 97/05 43/55 |
| 4,638,593 | A * | 1/1987 | Garcia | A01K 97/06 43/54.1 |
| 4,686,788 | A * | 8/1987 | Hartman | A01K 97/05 206/315.11 |
| D294,510 | S | 3/1988 | Michaelson et al. | |
| 4,794,723 | A * | 1/1989 | Arnold | A01K 97/04 43/54.1 |
| 4,871,079 | A * | 10/1989 | Doucette | A01K 97/04 220/560 |
| 4,878,311 | A * | 11/1989 | Cano | A01K 97/06 43/54.1 |
| 4,996,790 | A * | 3/1991 | Ruggles | A01K 97/04 43/54.1 |
| 5,117,577 | A * | 6/1992 | Burghoff | A01K 97/02 43/44.99 |
| 5,123,198 | A * | 6/1992 | Von Grossmann | A01K 97/05 43/55 |
| 5,191,732 | A | 3/1993 | Berdinsky | |
| 5,529,204 | A * | 6/1996 | Sykes | A01K 97/05 220/560 |
| 5,551,186 | A * | 9/1996 | Harada | A01K 97/20 220/560 |
| 6,000,168 | A * | 12/1999 | Demusz | A01K 69/06 43/55 |
| 6,032,404 | A * | 3/2000 | Cincibus | A01K 97/05 206/315.11 |
| 7,788,843 | B2 * | 9/2010 | Boos, Jr. | A01K 97/20 43/55 |
| 8,943,735 | B2 | 2/2015 | Brown | |
| D737,400 | S | 8/2015 | Drummond | |
| 9,516,871 | B1 * | 12/2016 | Winter | A01K 97/05 |
| 9,560,842 | B2 * | 2/2017 | Athey | A01K 97/05 |
| D799,633 | S * | 10/2017 | Avery | D22/136 |
| 2005/0279013 | A1 * | 12/2005 | Iwaniec | A01K 81/06 43/55 |
| 2007/0251137 | A1 * | 11/2007 | Boos, Jr. | A01K 97/20 43/55 |
| 2015/0121743 | A1 * | 5/2015 | Athey | A01K 97/05 43/55 |

\* cited by examiner

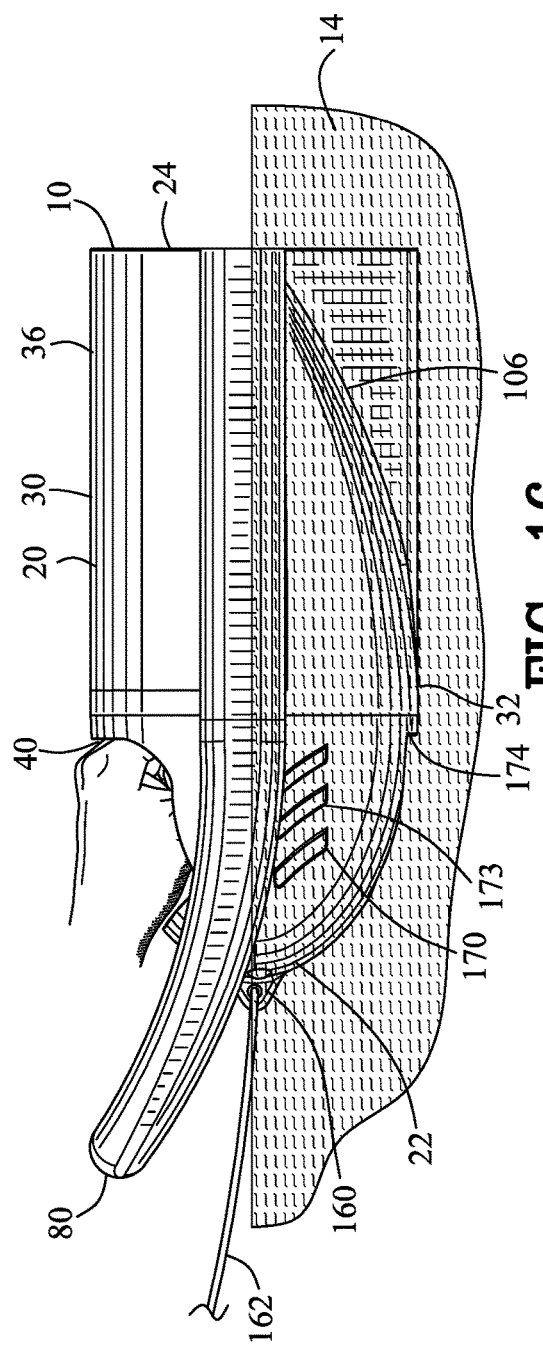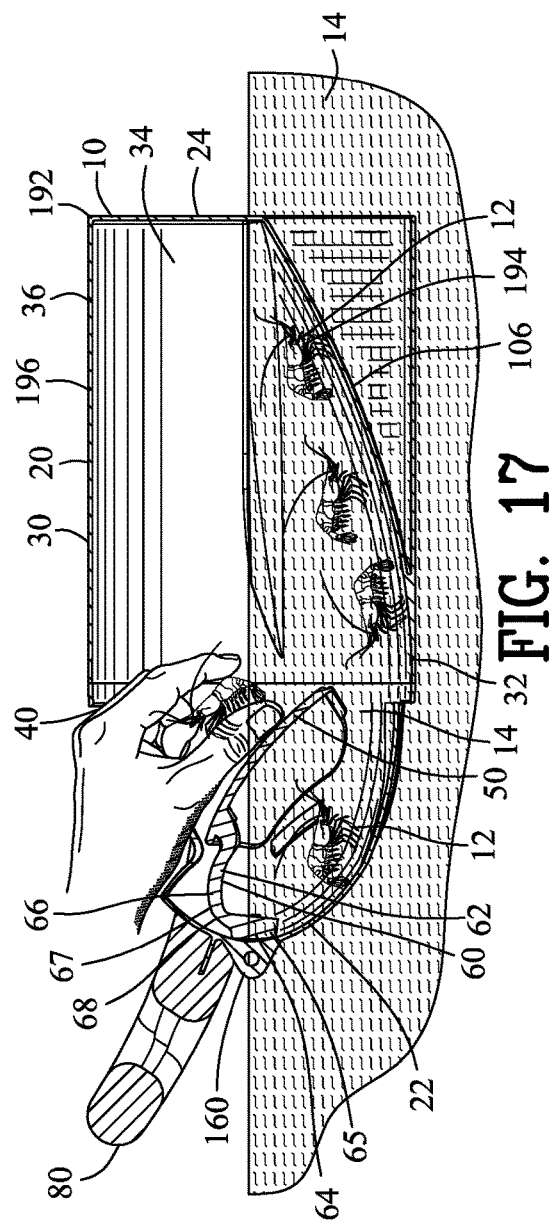

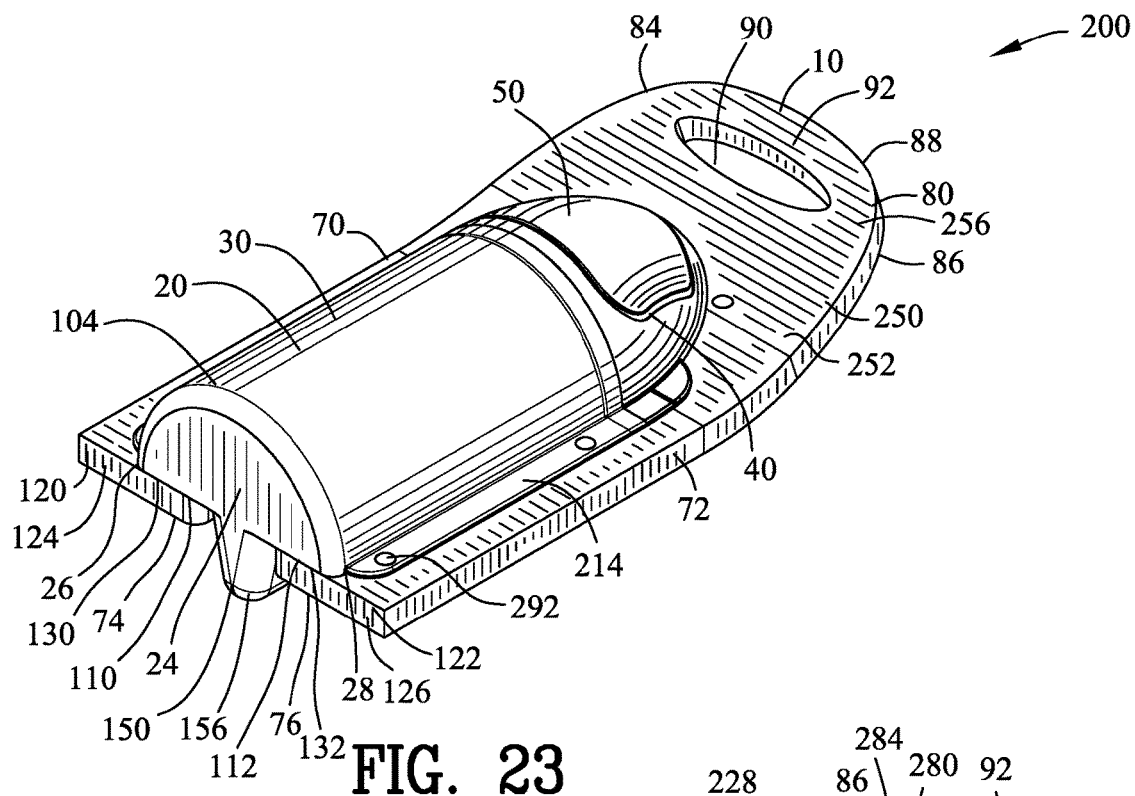
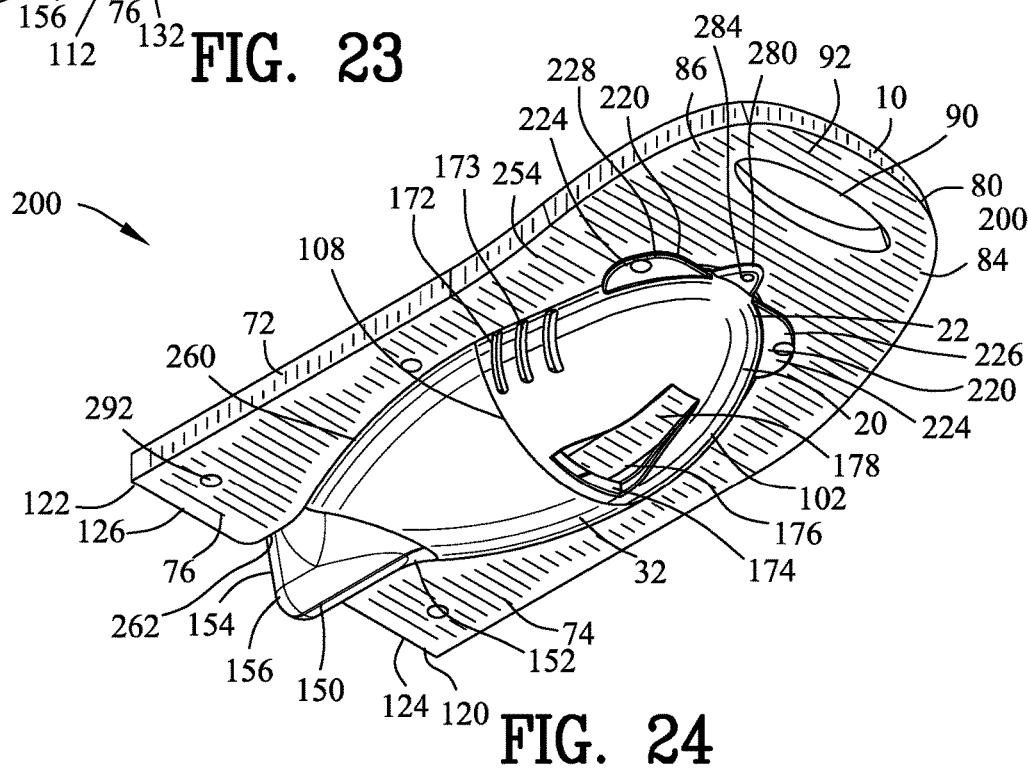

MARINE CONTAINMENT DEVICE

CROSS-REFERENCE TO RELATED APPLICATIONS

This application claims benefit of U.S. Patent Provisional application No. 62/296,787 filed Feb. 18, 2016. All subject matter set forth in provisional application Ser. No. 62/296,787 is hereby incorporated by reference into the present application as if fully set forth herein.

BACKGROUND OF THE INVENTION

Field of the Invention

This invention relates to a containers and more particularly to a marine containment device.

Background of the Invention

Live bait presents the most natural predator fish attractant available to the fisherman. Keeping live bait alive requires a near natural environment for the bait. A simple bucket filled with water has been used, but was rather inadequate since the water would soon become deoxygenated resulting in death to the contained baitfish. Additionally, the container could easily be overturned, spilling the contents.

These problems were subsequently addressed in the prior art by containers specifically designed to contain bait. These devices were designed to contain the bait as well as to maintain enough water circulation to prevent deoxygenation of the contained water. Some of these bait containers were designed to be placed in the body of water being fished, with a tether maintaining control of the bait container.

The ability to easily transport the baitfish from one fishing location to the next is highly advantageous to the fisherman. Devices with handles for lifting the container completely out of the water and devices of various shapes for trolling behind a small boat appear in the prior art.

There have been many in the prior art who have attempted to solve these problems with varying degrees of success. None, however completely satisfies the requirements for a complete solution to the aforestated problem. The following U. S. Patents are attempts of the prior art to solve this problem U.S. Pat. No. 3,009,281 to Unger disloses a minnow bucket comprising a substantially cylindrical casing with a pair of longitudinally positioned buoyant chambers positioned at either side of the casing. The casing has a conical forward end wall with a spring-urged door having openings therein. The casing has an upper wall provided with a substantially rectangular opening against which the perimeter portions of the spring-urged door bear. The spring-urged door is angularly inclined and is pivoted to the conical end wall. The end wall has a further opening communicating with the casing opening. The casing has further openings opposed to the door openings. The casing has a rear wall with a weighted member attached to the rear wall in opposed relation to the door, whereby the door will remain in an upper position when placed in water.

U.S. Pat. No. 4,297,804 to Weld discloses a floating container, specially adapted to hold live bait, which is shaped like a small boat so that it can be pulled behind a fishing vessel without sinking. The container is transparent so that the bait carried therein can be seen and thus attract game fish in the surrounding water. The container is structured to provide proper aeration for the bait, yet allow access to it when needed. Closure doors are positioned to shut independently when the container is being towed.

U.S. Pat. No. 4,554,757 to Sakuta, Jr. discloses a bait container in the form of an upwardly opening bucket including a hollow domed cover removably stationarily engagingly supported from and closing the upper end of the bucket. A pivoted bail-type handle is supported from the bucket and swingable between an upstanding position disposed over the upper portion of the domed cover and a generally horizontal position disposed to one side of the cover. The cover is readily removable from the upper end of the bucket when the handle is in the horizontal position and the handle and domed cover include coacting structure for releasably latching the handle in the upstanding position. The handle, when in the upstanding position, serves to latch the cover to the bucket against removal therefrom. One side portion of the domed cover includes an access opening formed therein provided with an openable closure therefor and the interior of the domed cover includes a flotation ring supported therefrom and extending about the access opening. The opposite side of the domed cover includes water ingress openings formed therein.

U.S. Pat. No. 4,603,503 to Haney discloses a light-weight, longitudinally extending, bottle-like fishing bait container for live minnows and the like. It has a body of transparent or see-through wall construction with a neck at one end thereof on which a lid is removably mounted for cleaning-out purposes. The body of the container is adapted to be carried in an endwise-suspended relation on the clothing belt of a fisherman by a flexible connector chain or the like of a clamping assembly, and also to be pulled behind a boat in a lengthwise floating and partially submerged relation. The connector chain is secured to the ring of a centrally positioned mounting boss or post on the lid. The lid has a central bait inserting and removing open portion in a bottom segment thereof, and a side group of water and air circulating holes therein in a balanced, side-positioned relation with respect to said open portion. A closure member of substantial quadrant shape is, at its inner end, swingably pivoted by a stem extending backwardly from the mounting boss substantially centrally of the lid. Importantly, the closure member is weighted to cooperate with the end assembly in always retaining a bottom half of the body in a substantially longitudinally aligned, submerged relation with respect to the surface of a body of water.

U.S. Pat. No. 4,686,788 to Hartman discloses a minnow bucket for containing live bait for fishing. The device comprises a housing closed at both ends and having an access door in one upper side wall of the housing. The minnow bucket is characterized by having a lift plate or basket which may be raised above the normal water level in the bucket by means of an external handle to provide easy access to the bait without discomfort from placing the hand in cold water. The access opening is provided with a door which is linked to the same handle for automatic opening. Latch means are provided for holding the handle in raised position. Preferably the bucket is buoyant by the provision of at least one air-tight chamber associated with the minnow bucket.

U.S. Pat. No. 4,794,723 to Arnold, et al. discloses a floating bait bucket and more particularly includes a surrounding ring formed of a foamed plastic material of closed cell construction providing buoyancy. The ring encircles a central deck. The deck supports a rectangular compartment lined with foamed plastic material which serves as a insulated storage chamber. It has a hinged lid which fastens with a latch. On top of that, another storage compartment is provided to receive fishing tackle. On top of that, a hinged lid closes over the fishing tackle to assure that the fishing tackle is secured therein. The device also supports a bait bucket having a lid and perforated sides to contain bait therein with water flow to assure that the bait is kept alive.

U.S. Pat. No. 5,123,198 to Von Grossmann discloses a bait bucket for holding bait in multiple compartments. The bait bucket comprises a first bait holding compartment including support means to removably receive and support a second bait compartment.

U.S. Pat. No. 7,788,843 to Boos, Jr. discloses a submergible container that includes a plurality of fluid passages formed through a container body to allow a chamber of the container to fill when submerged in water to form a live well. In embodiments described, the container is formed of an oval or egg shaped body to provide a streamline contour for towing through the water. In an illustrated embodiment, the container includes a wheel assembly and pull handle to transport the container over the ground. The illustrated container includes a closure that is operable between an open position and a closed position to insert items into the container.

Although the aforementioned prior art have contributed to the development of the art of fishing bait containers none of these prior art patents have solved the needs of this art.

Therefore, it is an object of the present invention to provide an improved bait container which is a significant advancement over the prior art.

Another object of this invention is to provide an improved bait container having a flotation collar, Another object of this invention is to provide an improved bait container that is easy for the operator to remove bait as desired.

Another object of this invention is to provide an improved bait container that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved marine containment device for containing a portion of water and a marine species. The marine containment device comprises a container having a front end, a rear end, a first side wall, a second side wall, an upper wall and a lower wall. The container defines an interior chamber. An aperture is in the container for inputting and outputting the marine species relative to the interior chamber. A closure door closes the aperture. A hinge pivotably couples the closure door with the container. A first flotation body is coupled to the first side wall. A second flotation body is coupled to the second side wall. The first flotation body and the second flotation body displace a portion of the body of water for providing a positive buoyancy while holding a portion of the body of water and marine species within the chamber when the container defines a horizontal position within the body of water. The rear end defines a linear plane for positioning on the surface and maintaining the container in a vertical position while holding a portion of the body of water and marine species within the chamber.

In a more specific embodiment of the invention, a front flotation body is coupled to the front end. The front flotation body displaces a portion of the body of water for providing a positive buoyancy and maintaining the aperture above the body of water when the container defines a horizontal position.

In one embodiment of the invention, a container fin is coupled to the lower wall for promoting a linear direction of the container during forward displacement of the container within the body of water. The container fin includes a front fin edge and a rear fin edge. The rear fin edge defines a rear fin plane. The rear fin plane aligns with the linear plane for creating an extending plane for positioning on the surface and maintaining the housing in a vertical position while holding a portion of the body of water within the chamber.

In another embodiment of the invention, the aperture defines a first side edge, a second side edge, a front edge and a rear edge. The closure door defines a first door side edge, a second door side edge, a front door edge and a rear door edge. The hinge defines a semi-rigid band extending between a proximal end and a distal end. The proximal end is coupled to the container adjacent to the front edge. The distal end is coupled to the closure door adjacent to the front door edge. The semi-rigid band pivots the closure door within the interior chamber.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 16 is an enlarged portion of FIG. 14 illustrating an individual pushing against the closure door and causing the closure door to pivot within the interior chamber for position a marine species within the interior chamber;

FIG. 17 is an elongated sectional view of FIG. 16 illustrating the interior chamber holding a portion of the body of water and marine species within the interior chamber when the container defines a horizontal position within the body of water;

FIG. 23 is a top rear isometric view of a second embodiment of the marine containment device incorporating the present invention;

FIG. 24 is a bottom front isometric view of FIG. 23;

Similar reference characters refer to similar parts throughout the several Figures of the drawings.

DETAILED DISCUSSION

Figure 18:
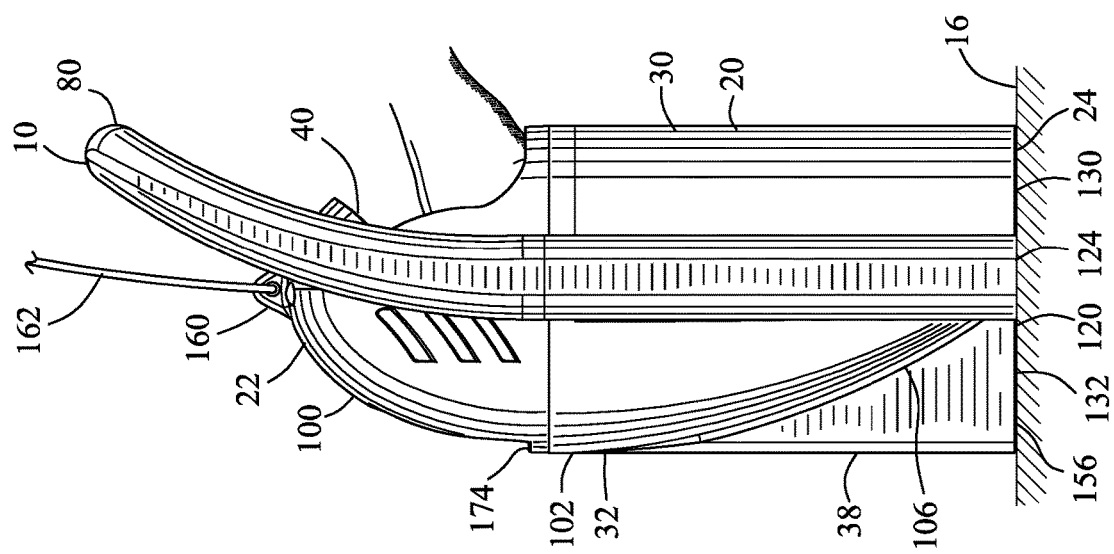
FIG. 18 is an enlarged view of FIG. 4 illustrating the container positioned on a supporting surface wherein the individual is pushing against the closure door and causing the closure door to pivot within the interior chamber for position a marine species within the interior chamber.
Figure 19:
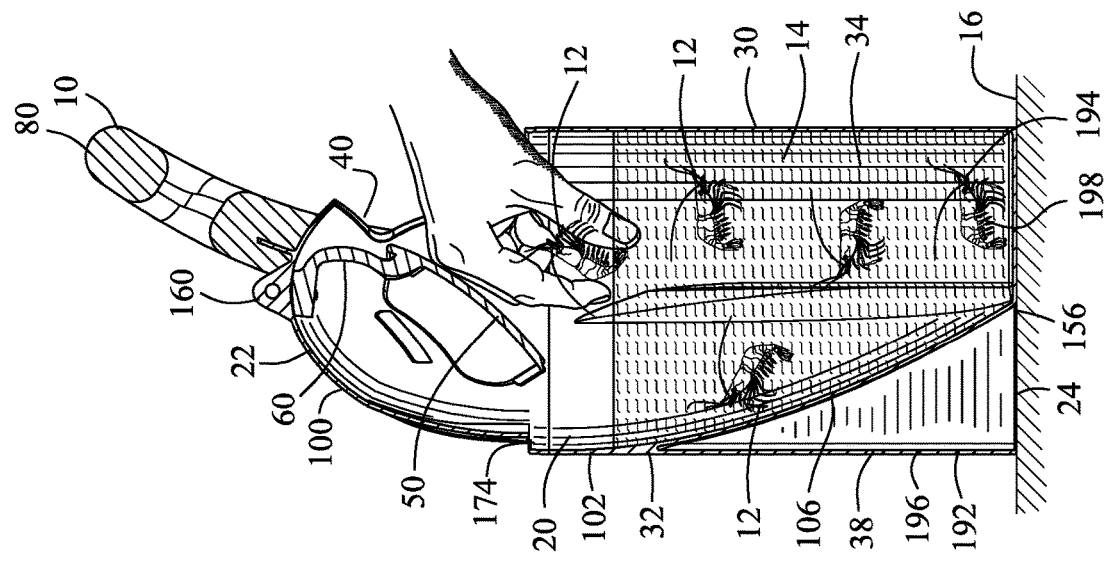
FIG. 19 is an elongated sectional view of FIG. 18 illustrating the interior chamber holding a portion of the body of water and marine species within the interior chamber when the container defines a vertical position.
Figure 20:
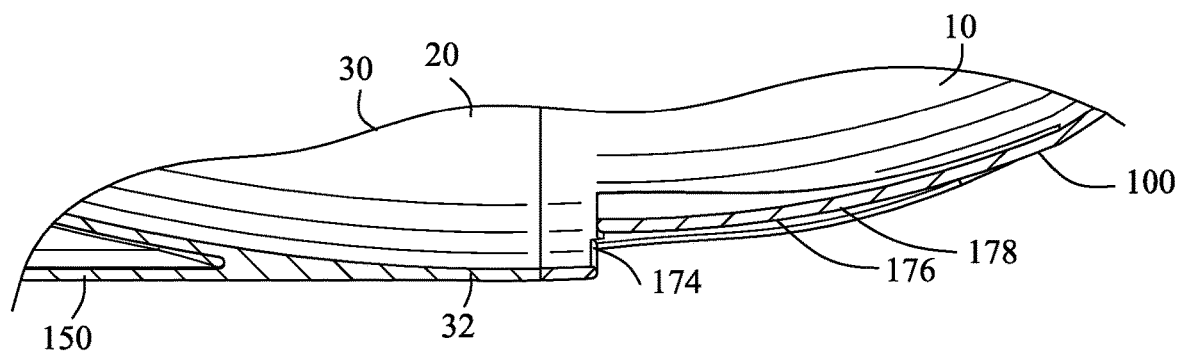
FIG. 20 is an enlarged portion of FIG. 11 illustrating an inlet duct.
Figure 21:
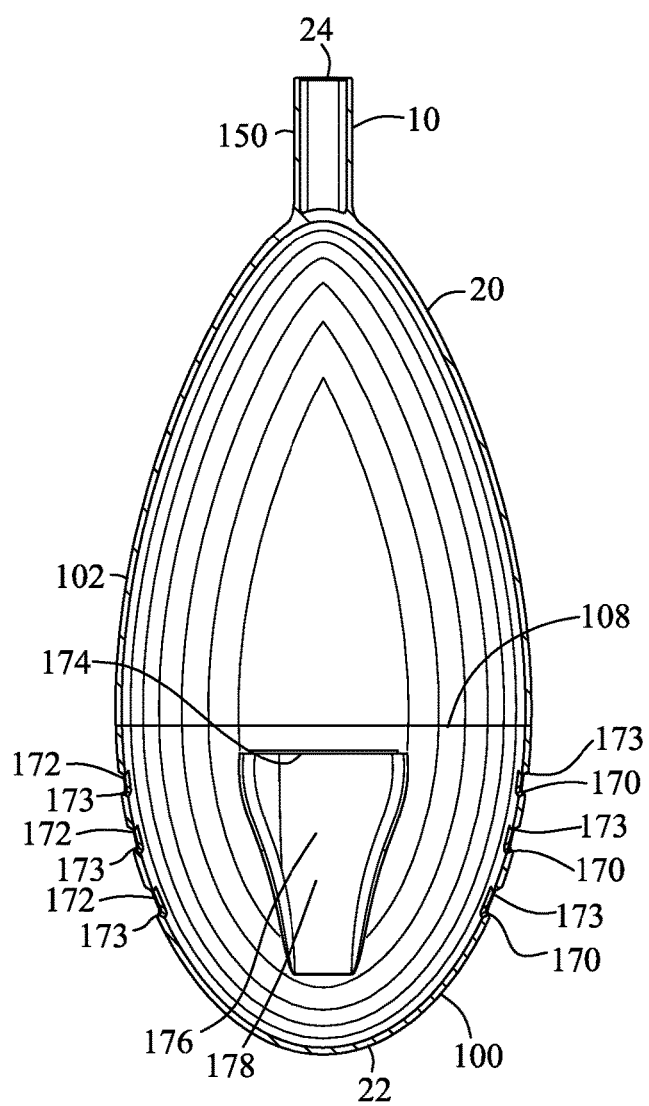
FIG. 21 is a sectional view along line 21-21 in FIG. 7.
Figure 22:
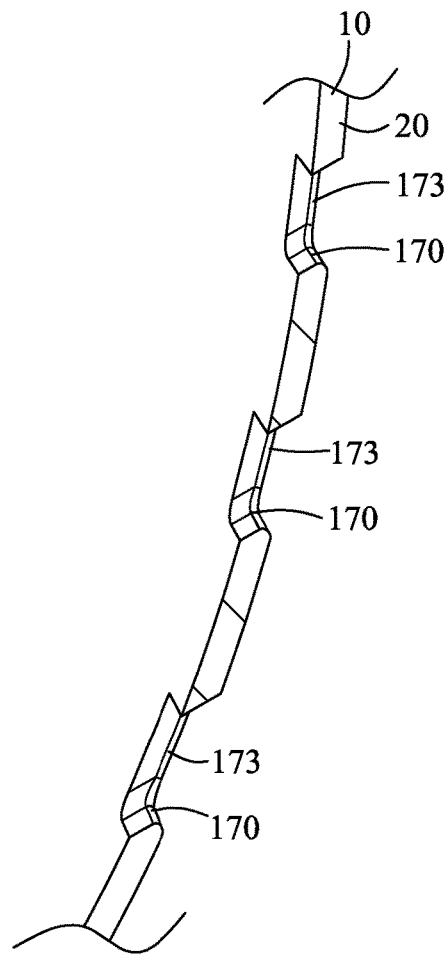
FIG. 22 is an enlarged portion of FIG. 21 illustrating a plurality of elongated water exit orifices.
Figure 25:
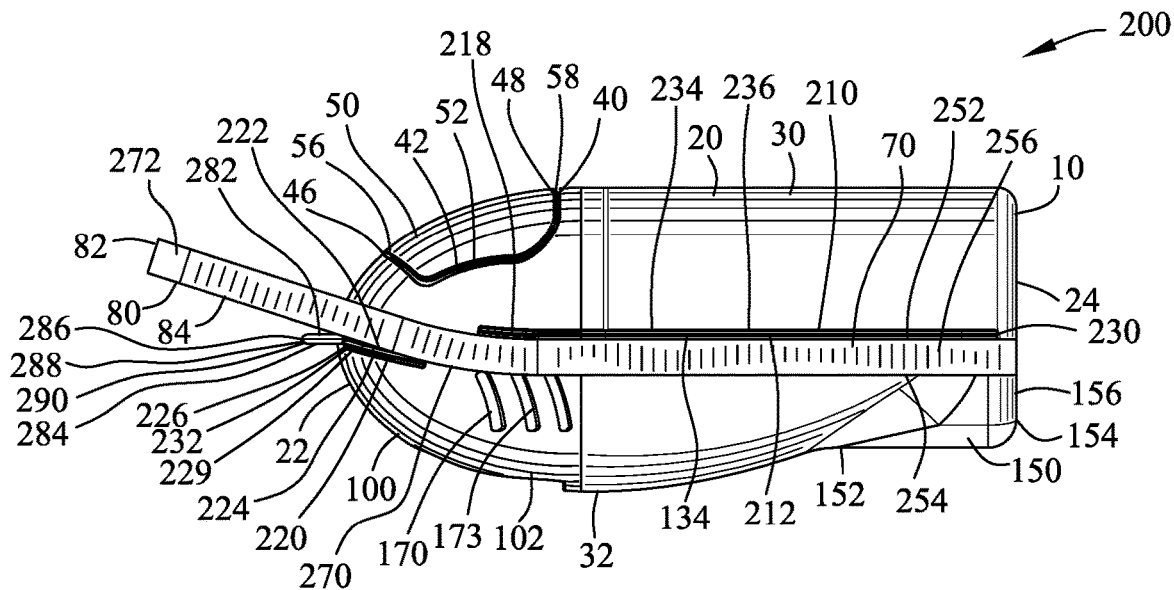
FIG. 25 is a left side view of FIG. 24.
Figure 26:
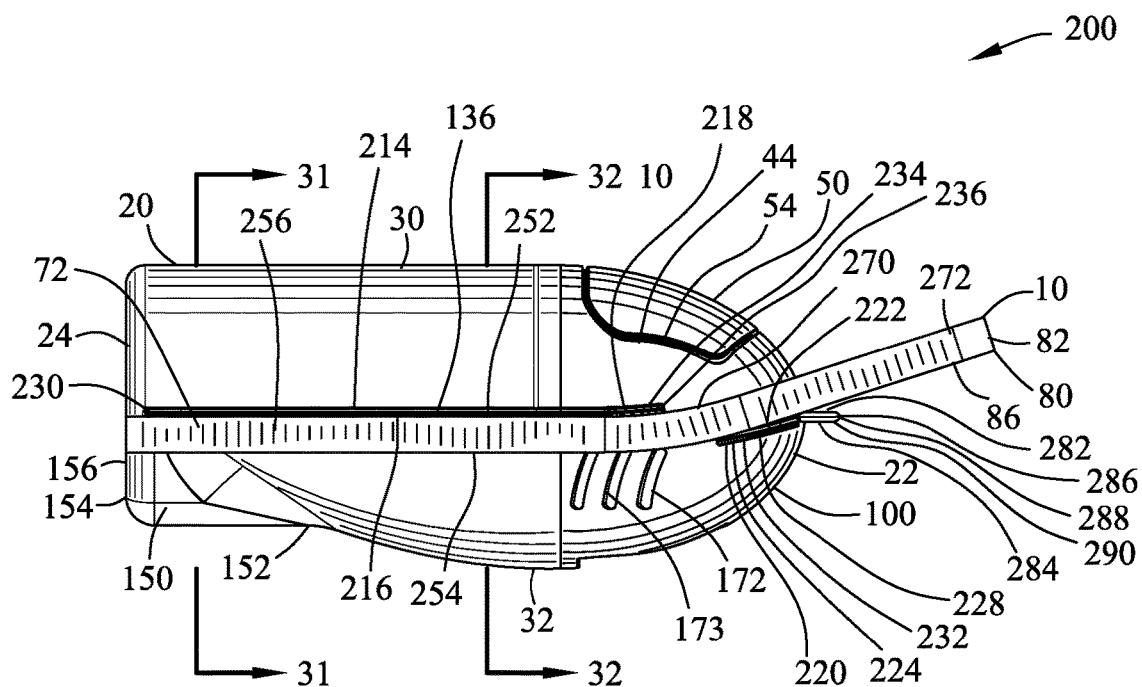
FIG. 26 is a right side view of FIG. 24.
Figure 27:
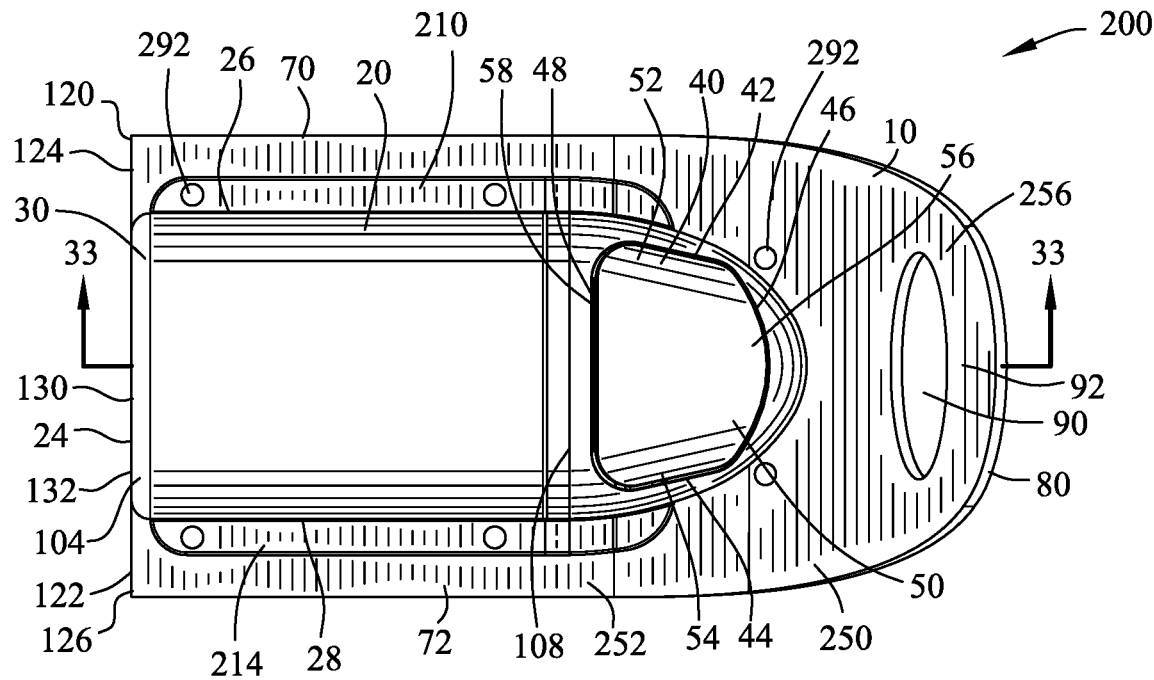
FIG. 27 is a top view of FIG. 25.
Figure 28:
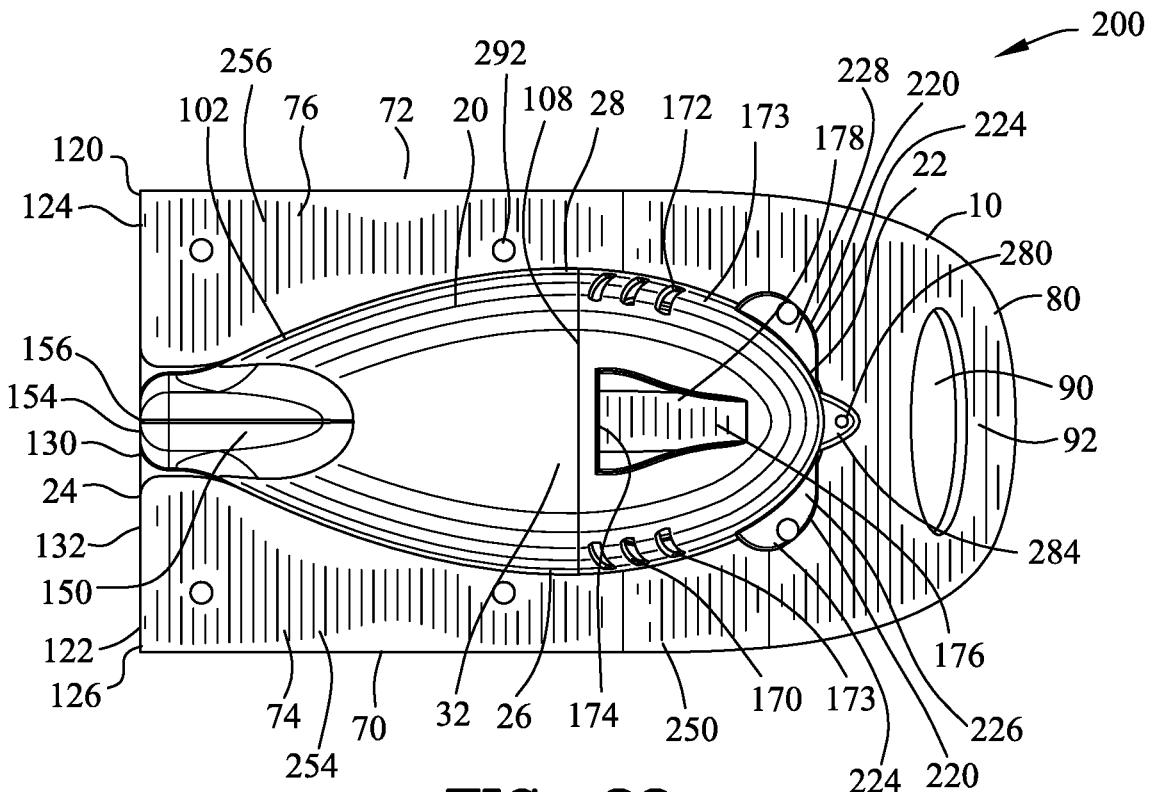
FIG. 28 is a bottom view of FIG. 25.
Figure 29:
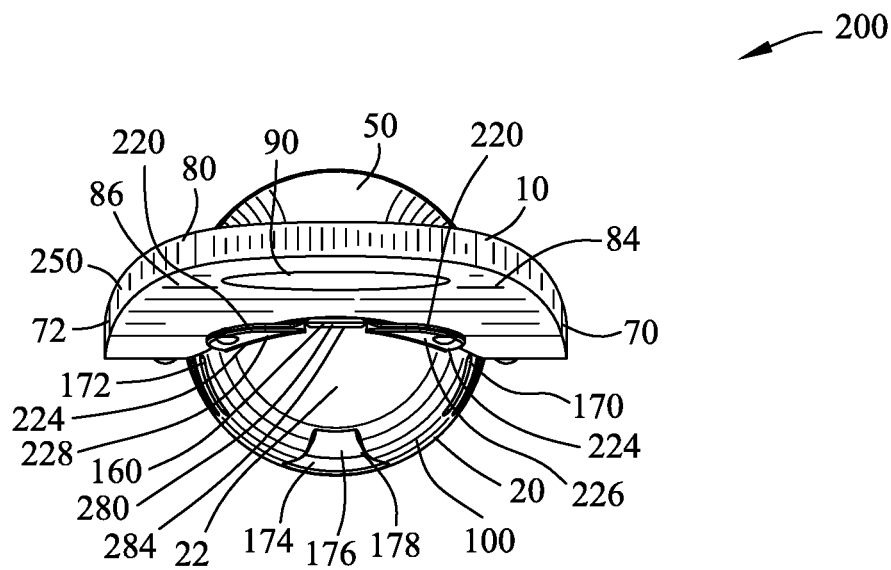
FIG. 29 is a front view of FIG. 25.
Figure 30:
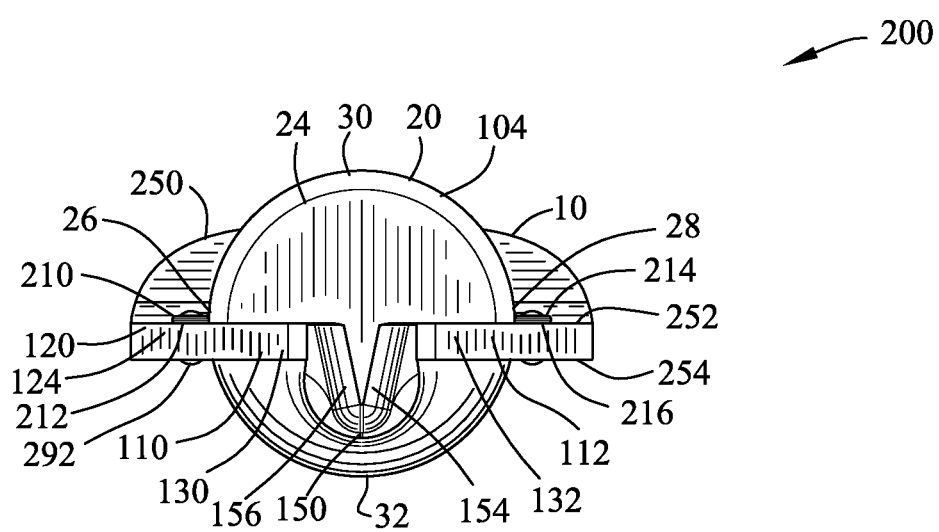
FIG. 30 is a rear view of FIG. 25.
Figure 31:
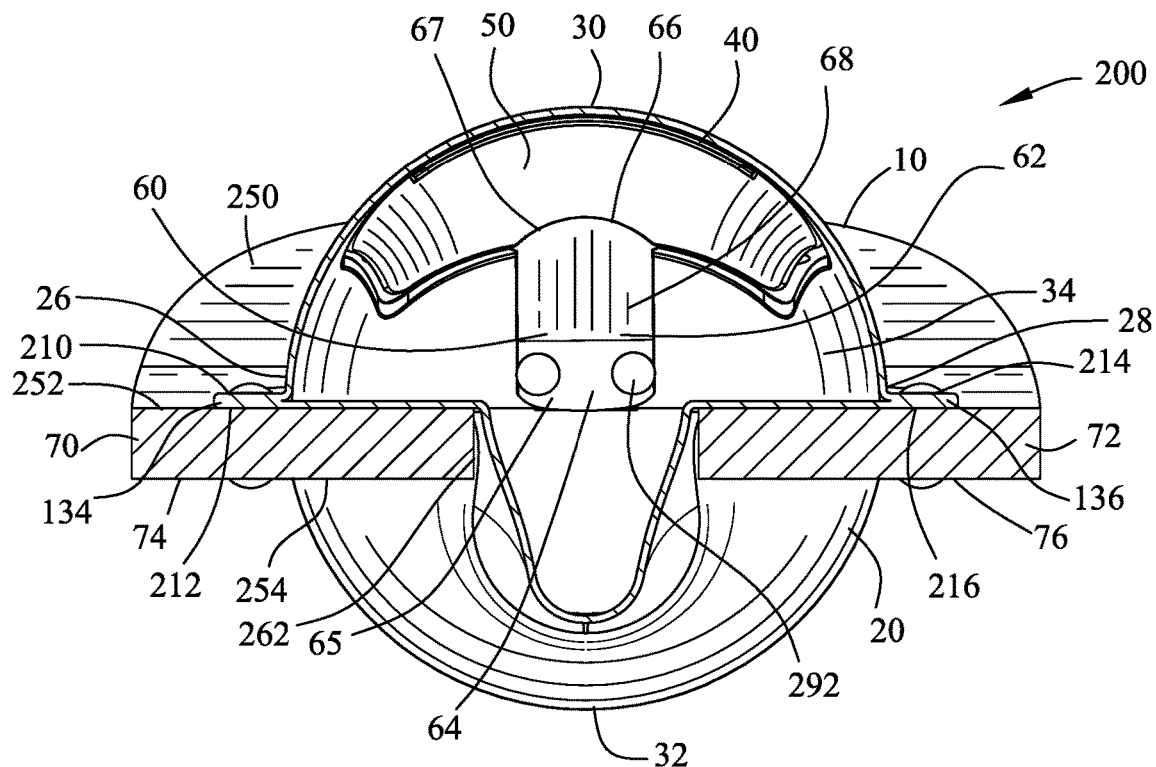
FIG. 31 is a sectional view along line 31-31 in FIG. 26.
Figure 32:
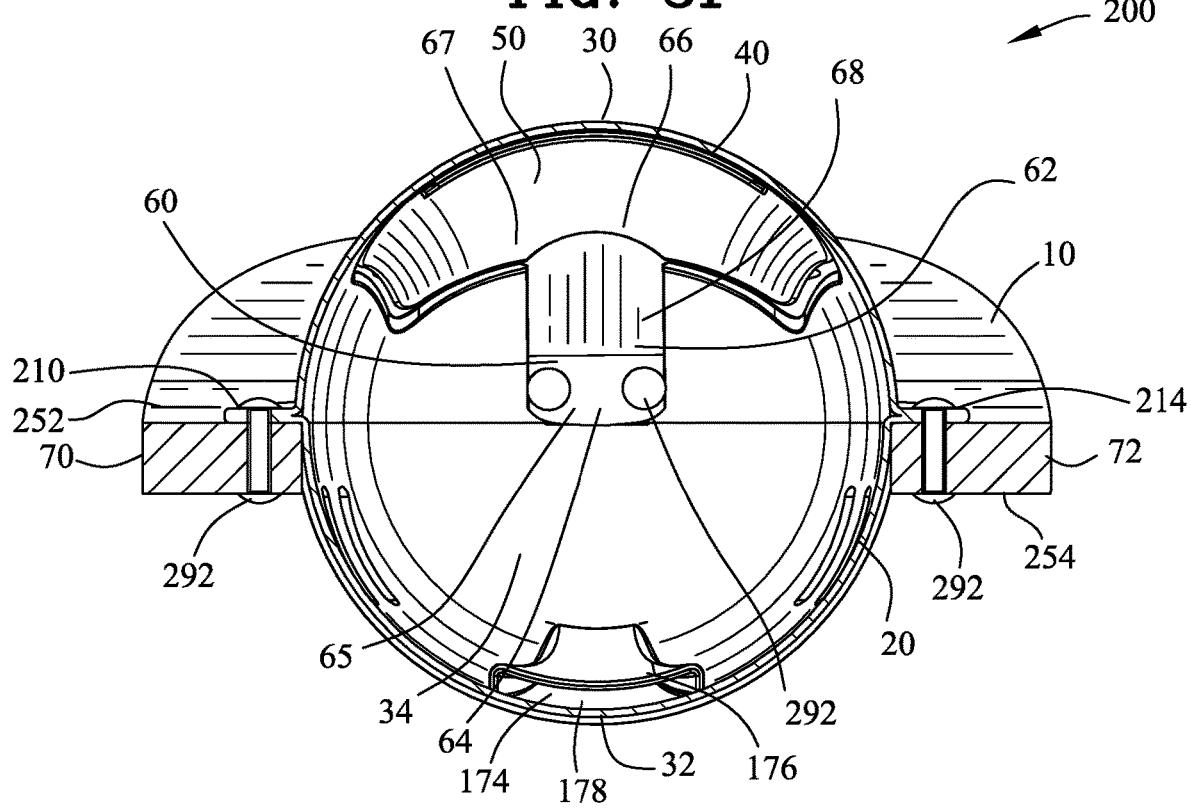
FIG. 32 is a sectional view along line 32-32 in FIG. 26.
Figure 33:
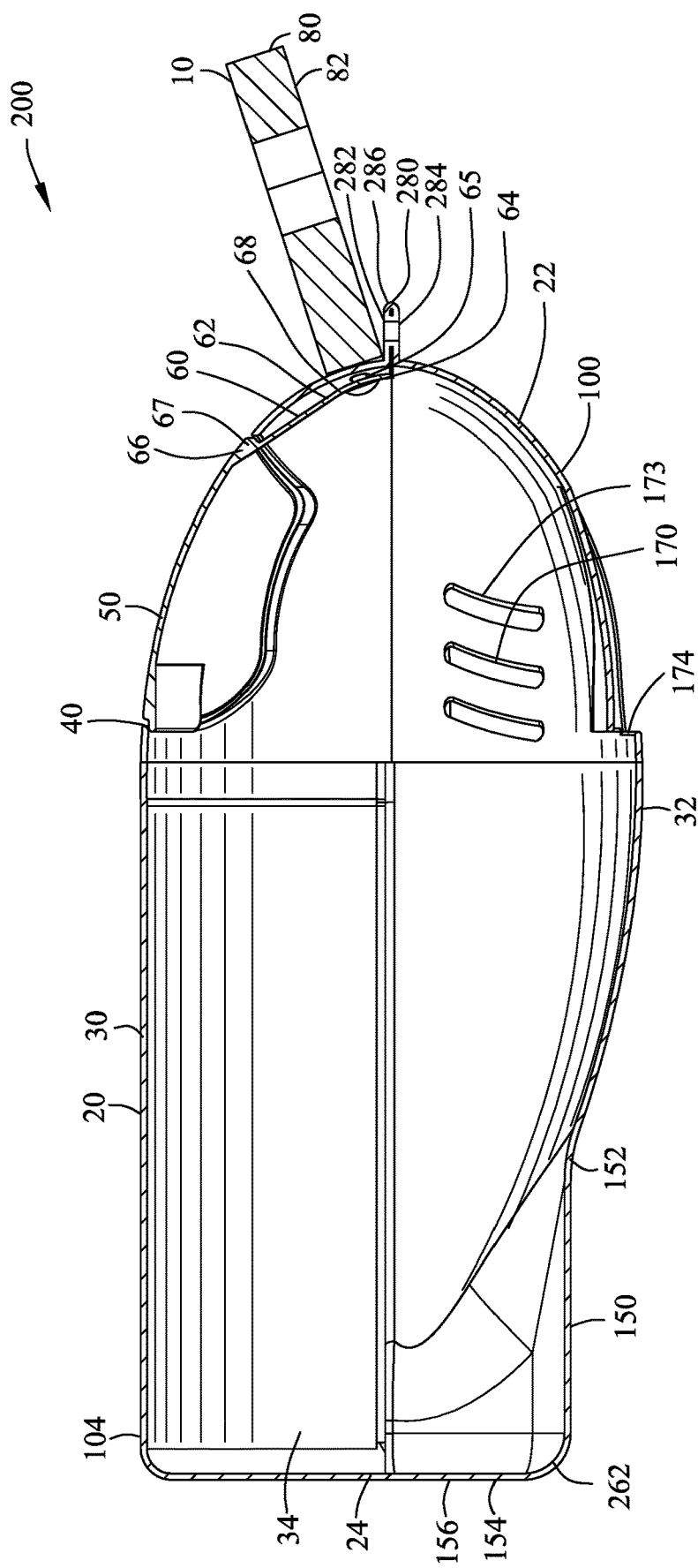
FIG. 33 is a sectional view along line 33-33 in FIG. 27.

FIGS. 1-33 illustrate a marine containment device 10 for containing a marine species 12. The marine species 12 may include fish, crabs, or other marine creatures. The marine containment device 10 maybe supported by a body of water 14 as shown in FIGS. 12-14, 16 and 17 or by a rigid surface 16 as shown in FIGS. 18 and 19.

The marine containment device 10 comprises a container 20 having a front end 22, a rear end 24, a first side wall 26, a second side wall 28, an upper wall 30 and a lower wall 32. The container 20 defines an interior chamber 34. The marine containment device 10 preferably is constructed of a corrosive resistant material such as polyolefins—polyethylene and polypropylene (HDPE, LDPE, UHMW, PP), Polyvinyl Chlorides—PVC and CPVC, fluoropolymers (PTFE, FEP, PFA, PVDF, PCTFE, ECTFE, ETFE, etc), stainless steel or other corrosive resistant materials.

An aperture 40 is in the container 20 for inputting and outputting the marine species 12 relative to the interior chamber 34. The aperture 40 defines a first side edge 42, a second side edge 44, a front edge 46 and a rear edge 48.

A closure door 50 closes the aperture 40. The closure door 50 defines a first door side edge 52, a second door side edge 54, a front door edge 56 and a rear door edge 58. The closure door 50 preferably is constructed of a corrosive resistant material such as polyolefins—polyethylene and polypropylene (HDPE, LDPE, UHMW, PP), Polyvinyl Chlorides—PVC and CPVC, fluoropolymers (PTFE, FEP, PFA, PVDF, PCTFE, ECTFE, ETFE, etc), stainless steel or other corrosive resistant materials.

A hinge 60 pivotably couples the closure door 50 with the container 20. The hinge 60 may define a semi-rigid band 62 extending between a proximal end 64 and a distal end 66. The proximal end 64 of the semi-rigid band 62 is coupled to the container mounting base 65 which is in turn attached to the interior of the front end 22 of the container 20. The distal end 66 is coupled to the closure door 50 adjacent to the front door edge 56 of the closure door 50. The semi-rigid band 62 pivots the closure door 50 within the interior chamber 34. The semi-rigid band 62 includes a container mounting base 65 and a door mounting base 67 coupled by a bending arm 68. The bending arm 68 bends upon a force applied to the closure door 50. Upon the removal of the force upon the closure door 50, the bending arm 68 applies a return force for returning the closure door 50 within the aperture 40. The semi-rigid band 62 may be constructed from a polymeric material. Alternatively, the hinge 60 may include a mechanical hinge and return spring.

Figure 15:
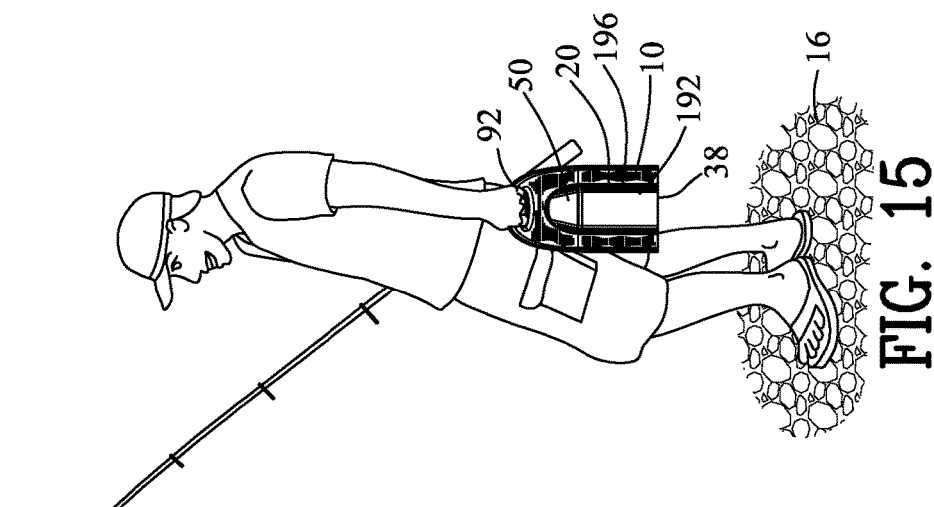
FIG. 15 is a view similar to FIG. 5 illustrating the marine containment device being lifted and carried in a vertical position.

A first flotation body 70 is coupled to the first side wall 26. A second flotation body 72 is coupled to the second side wall 28. The first flotation body 70 and the second flotation body 72 displace a portion of the body of water 14 for providing a positive buoyancy while holding a portion of the body of water 14 and marine species 12 within the interior chamber 34 when the container 20 defines a horizontal position 36 as shown in FIGS. 12-14, 16 and 17 within the body of water 14. The rear end 24 defines a linear plane 132 for positioning on the surface 16 and maintaining the container in a vertical position 38 as shown in FIGS. 15, 18 and 19 while holding a portion of the body of water 14 and marine species 12 within the interior chamber 34.

The front end 22 may define a round nose shape 100 for producing more streamline flow of water over the container 20 during forward displacement of the container 20 within the body of water 14. The lower wall 32, the front end 22, the first side wall 26 and the second side wall 28 define a teardrop shape 102 for producing more streamline flow of water over the container 20 during forward displacement of the container 20 within the body of water 14. The upper wall 30, the first side wall 26 and the second side wall 28 define a half-cylinder shape 104 for sufficient volume within said interior chamber 34 for the portion of the body of water 14. The lower wall 32 may include an ascending arcuate slope 106.

A first elongated shoulder 110 is defined by the half-cylinder shape 104 adjacent to the first side wall 26 and the teardrop shape 102. A second elongated shoulder 112 is defined by the half-cylinder shape 104 adjacent to the second side wall 28 and the teardrop shape 102. A first shoulder flotation body 74 is coupled to the first elongated shoulder 110. A second shoulder flotation body 76 is coupled to the second elongated shoulder 112. The first shoulder flotation body 74 and the second shoulder flotation body 76 displace a portion of the body of water 14 for providing a positive buoyancy and maintaining the aperture 40 above the body of water 14 when the container 20 defines a horizontal position 36.

A front flotation body 80 may be coupled to the front end 22. The front flotation body 80 displaces a portion of the body of water 14 for providing a positive buoyancy and maintaining the aperture 40 above the body of water 14 when the container 20 defines a horizontal position 36. The front flotation body 80 may include an ascending arcuate platform 82 relative to the first flotation body 70 and the second flotation body 72. The ascending arcuate platform 82 prevents the front end 22 of the container 20 descending into the body of water 14 during forward displacement of the container 20 within the body of water 14.

The first flotation body 70, the second flotation body 72 and the front flotation body 80 may be secured to the container 20 by an adhesive, mechanical fasteners, or other coupling means. In order to increase the surface area between the container 20 and the first flotation body 70, the second flotation body 72 and the front flotation body 80, the container 20 may further include a first body plate 134, a second body plate 136, and a front body plate 138 extending from the first side wall 26, the second side wall 28 and the front end 22 respectively. The first flotation body 70, the second flotation body 72 and the front flotation body 80 have a first body channel 140, a second body channel 142 and a front body channel 144, respectively. The first body plate 134, the second body plate 136, and the front body plate 138 are inserted into the first body channel 140, a second body channel 142 and a front body channel 144, respectively for increasing the surface area between the container 20 and the first flotation body 70, the second flotation body 72 and the front flotation body 80.

The front flotation body 80 may further include a first arcuate edge 84 and a second arcuate edge 86. The first arcuate edge 84 and the second arcuate edge 86 define a tapering platform 88. The tapering platform 88 prevents the front end 22 of the container 20 descending into the body of water 14 during forward displacement of the container 20 within the body of water 14. The front flotation body 80 may include an elongated aperture 90 for defining a griping body 92. The griping body 92 permits lifting and carrying the container 20 in a vertical position 38 as shown in FIG. 15 while holding a portion of the body of water 14 and marine species 12 within the interior chamber 34 as shown in FIG. 19.

The first flotation body 70 defines a first rear flotation edge 120 and the second flotation body 72 defines a second rear flotation edge 122. The first rear flotation edge 120 defines a first rear flotation plane 124. The second rear flotation edge 122 defines a second rear flotation plane 126. The first rear flotation plane 124 and the second rear flotation plane 126 align with the linear plane 132 for creating an extending plane 130 for positioning on the surface 16 and maintaining the container 20 in a vertical position 38 while holding a portion of the body of water 14 and marine species 12 within the interior chamber 34. Preferably, the first flotation body 70, the second flotation body 72 and the front flotation body 80 may be constructed of a plastic foam material. Alternatively, the first flotation body 70, the second flotation body 72 and the front flotation body 80 may be constructed of a hollow body from a corrosive resistant material as discussed above.

A container fin 150 maybe coupled to the lower wall 32 for promoting a linear direction of the container 20 during forward displacement of the container 20 within the body of water 14. The container fin 150 includes a front fin edge 152 and a rear fin edge 154. The rear fin edge 154 defines a rear fin plane 156. The rear fin plane 156 aligns with the linear plane 132 for creating an extending plane 130 for positioning on the surface 16 and maintaining the container 20 in a vertical position 38 while holding a portion of the body of water 14 within the interior chamber 34. Preferably, the container fin 150 and the container 20 are formed from an interior one piece unit constructed a corrosive resistant material such as polyolefins—polyethylene and polypropylene (HDPE, LDPE, UHMW, PP), Polyvinyl Chlorides—PVC and CPVC, fluoropolymers (PTFE, FEP, PFA, PVDF, PCTFE, ECTFE, ETFE, etc), stainless steel or other corrosive resistant materials.

An eyelet 160 is coupled to the front end 22. A tether 162 is secured to the eyelet 160 for pulling the container 20 in a forward displacement within the body of water 14. One or more first elongated water exit orifice(s) 170 are positioned on the first side wall 26 just beneath the first flotation body 70 near a teardrop maximum width 108 of the teardrop shape 102. One or more second elongated water exit orifice(s) 172 are positioned on the second side wall 28 just beneath the second flotation body 72 near the teardrop maximum width 108 of the teardrop shape 102. Preferably, the first elongated water exit orifice(s) 170 and the second elongated water exit orifice(s) 172 are constructed with a rearward angle 173. The first elongated water exit orifice(s) 170 and the second elongated water exit orifice(s) 172 are so positioned and the rearward angle 173 constructed such that they occur in an area of low pressure according to Bernoulli's principle, promoting water to exit from the interior chamber 34 through the first elongated water exit orifce(s) 170 and the second elongated water exit orifice(s) 172 during forward displacement of the container 20 through the body of water 14.

A lower elongated inlet orifice 174 is in the front end 22, adjacent to the lower wall 32 and positioned near the teardrop maximum width 108 of teardrop shape 102. A recessed channel 176 is in the front end 22 and aligned with the lower elongated inlet orifice 174 for channeling the body of water 14 into the interior chamber 34 when the container 20 defines a horizontal position 36 within the body of water 14. The lower elongated orifice 174 and recessed channel 176 define an inlet duct 178 for more streamline flow of water over the container 20 during forward displacement of the container 20 within the body of water 14. The preferred embodiment of inlet duct 178 is a NACA duct which optimizes total pressure, or total head, recovery at the inlet orifice, resulting in high inlet pressure, and promoting water flow into chamber 34 during forward displacement of the container 20 through the body of water 14.

As best shown in FIGS. 11, 12, 13, 14 and 17, when the container 20 is displaced in a forward direction within the body of water 14, the water 14 is directed into the inlet duct 178. It is postulated water exchange is promoted between the interior chamber 34 and the outside body of water 14 by the high inlet pressure at the lower elongated inlet orifice 174 in combination with the low exit pressure at the elongated water exit orifices 170 and 172. For purposes of minimizing the resistance of water flow through the orifices 170, 172 and 174, single circular orifices located at the teardrop maximum width 108 would be ideal since a circular orifice maximizes the hydraulic diameter, a ratio of orifice area to orifice perimeter, however elongated orifices are necessary to prevent the marine species from exiting the container through the water inlet and exit orifices. The elongated orifices are shown to be superior to multiple circular orifices of equivalent area by comparison of the hydraulic diameter between the competing configurations. This renewing of the water 14 within the interior chamber 34 improves the environment for the marine species 12 for prolonging longevity.

Figure 1:
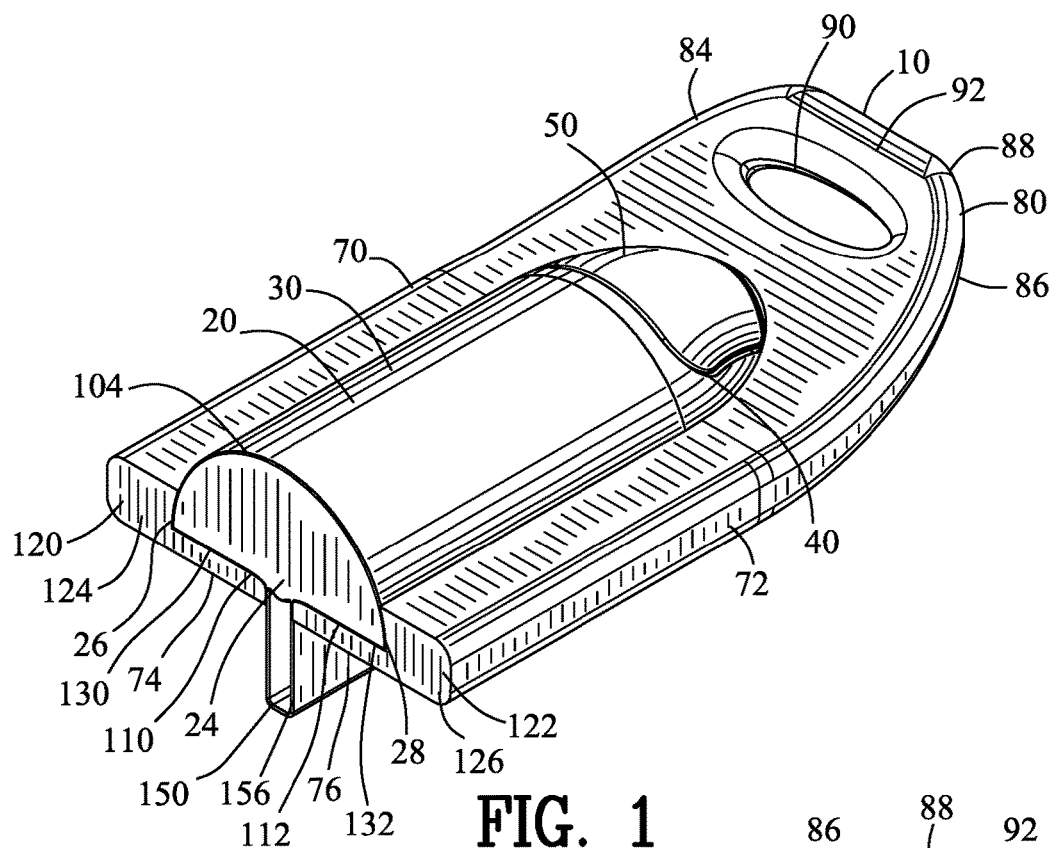
FIG. 1 is a top rear isometric view of a marine containment device incorporating the present invention.
Figure 2:
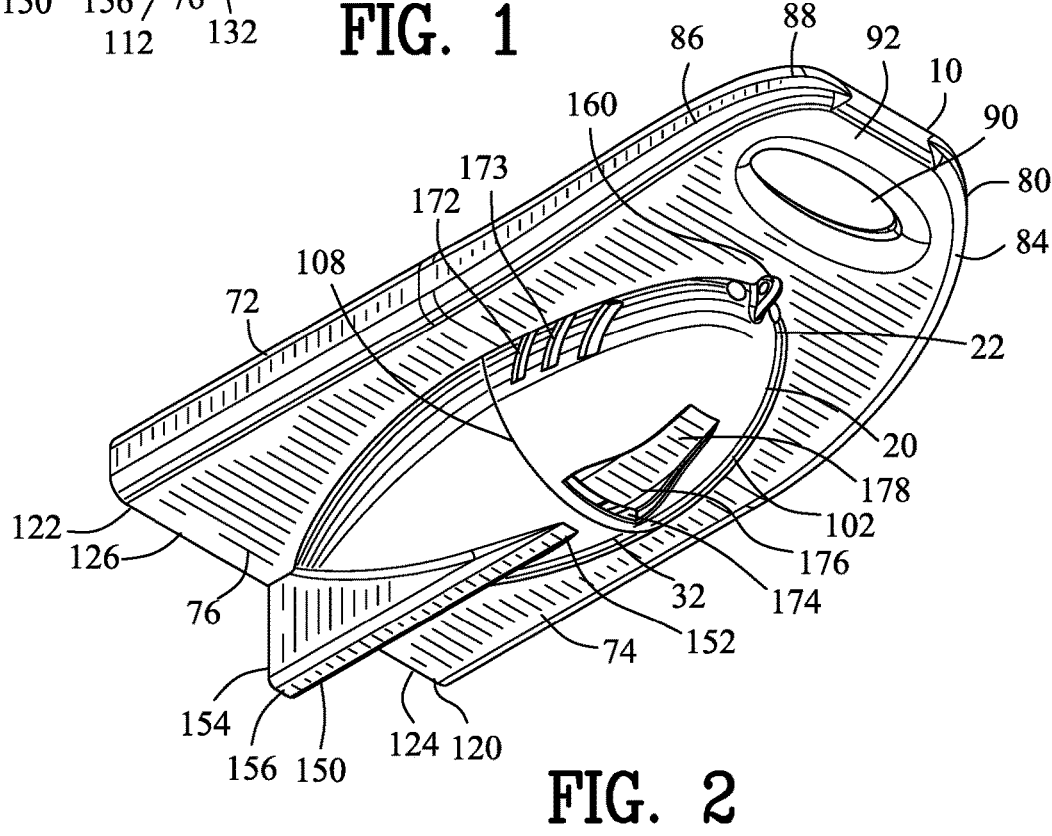
FIG. 2 is a bottom front isometric view of FIG. 1.
Figure 3:
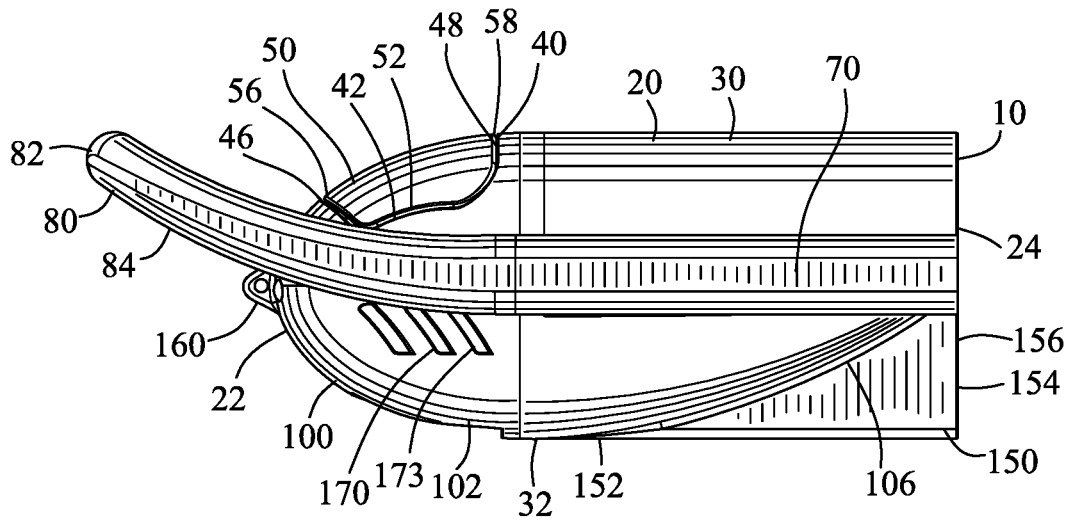
FIG. 3 is a left side view of FIG. 2.
Figure 4:
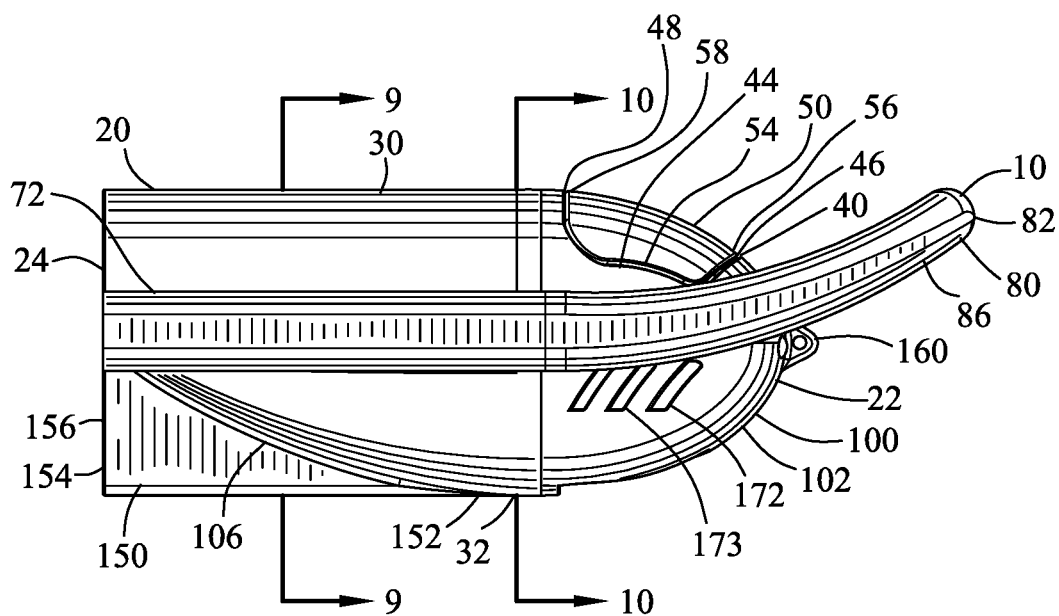
FIG. 4 is a right side view of FIG. 2.
Figure 5:
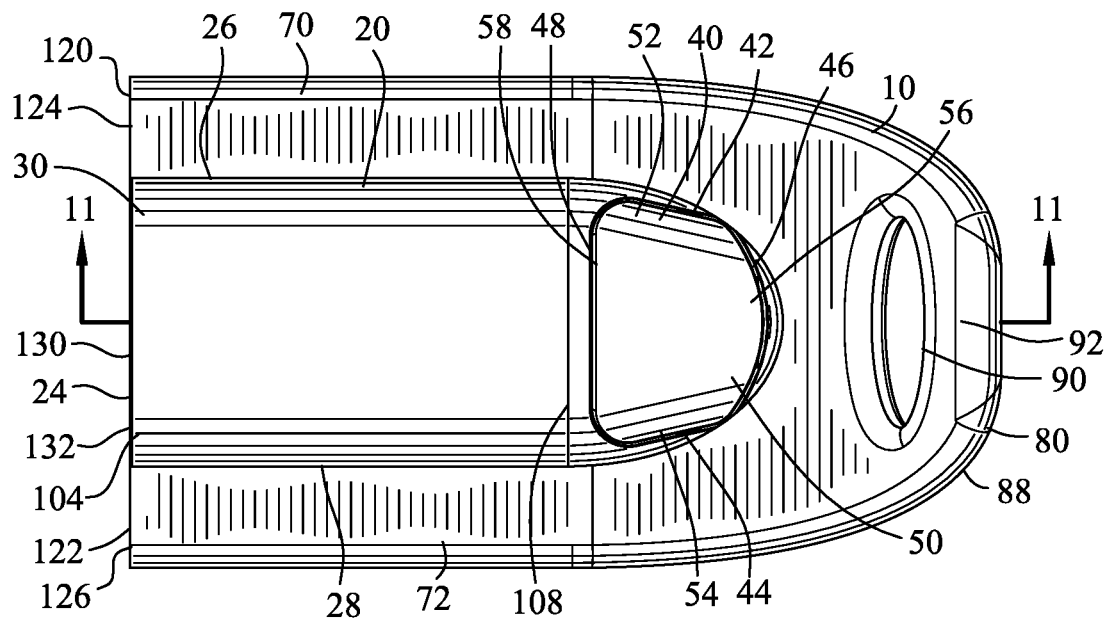
FIG. 5 is a top view of FIG. 3.
Figure 6:
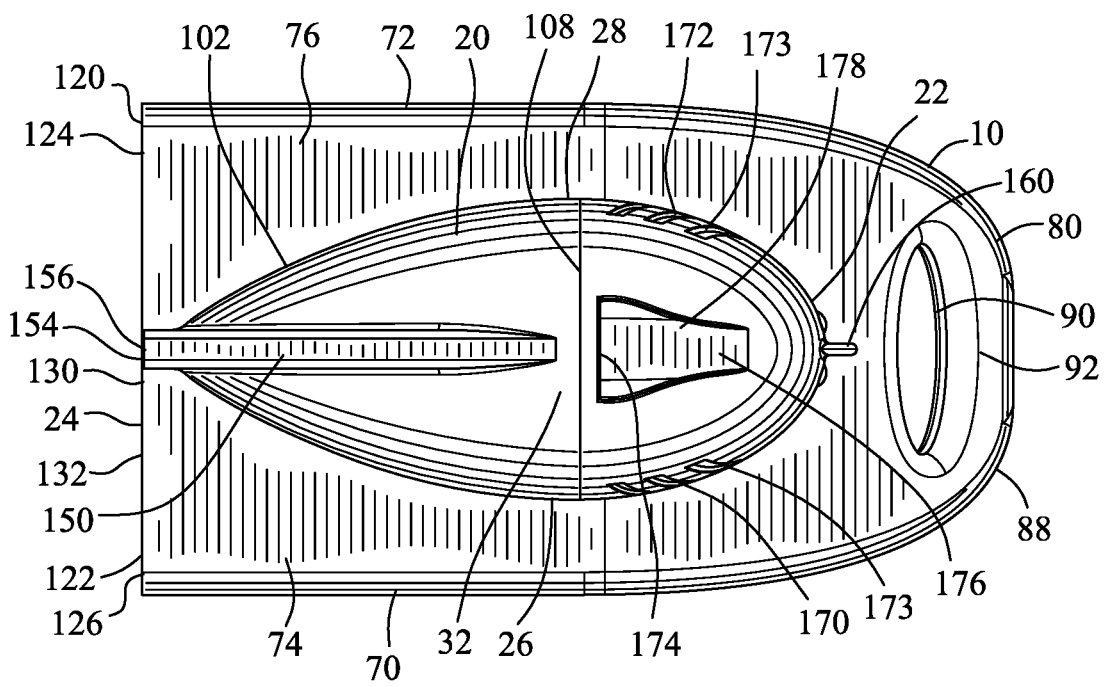
FIG. 6 is a bottom view of FIG. 3.
Figure 7:
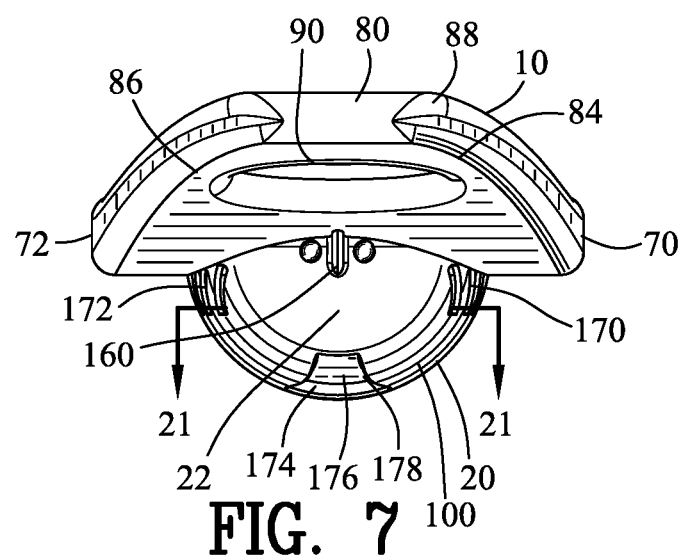
FIG. 7 is a front view of FIG. 3.
Figure 8:
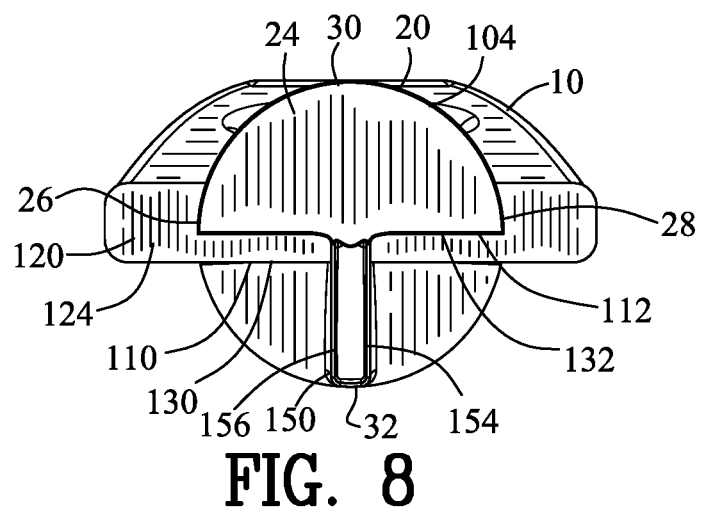
FIG. 8 is a rear view of FIG. 3.
Figure 9:
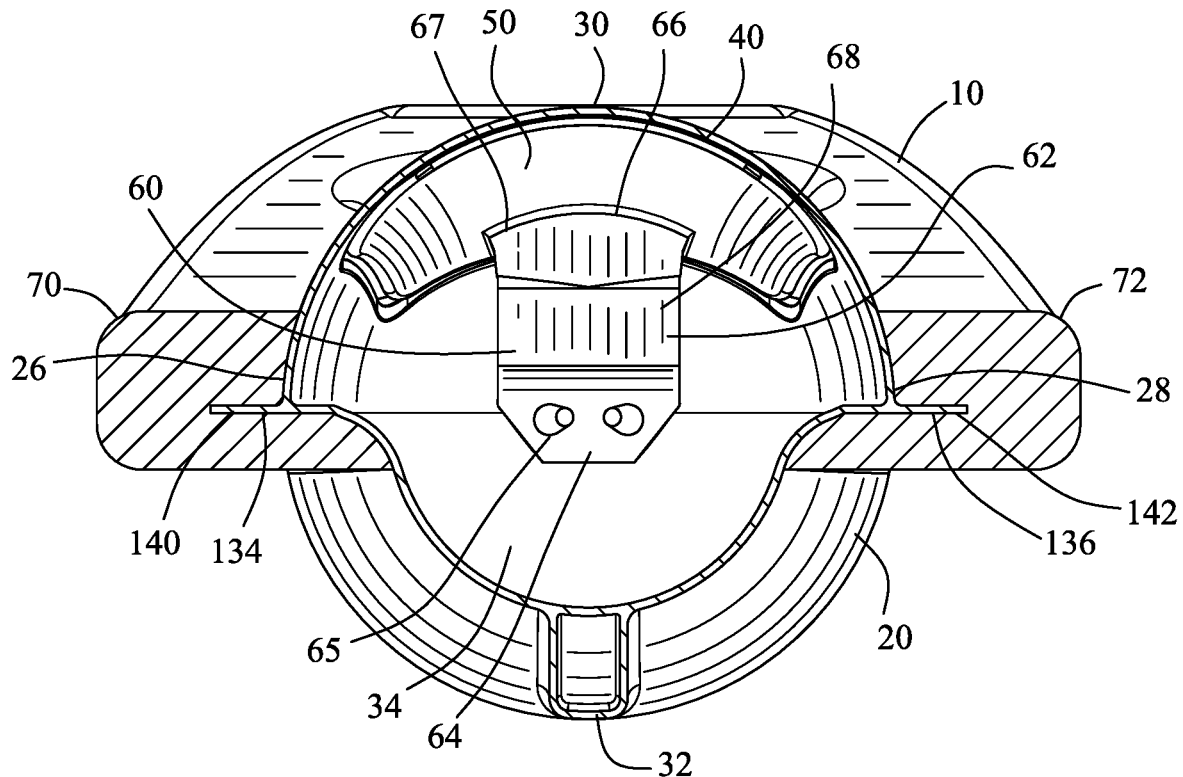
FIG. 9 is a sectional view along line 9-9 in FIG. 3.
Figure 10:
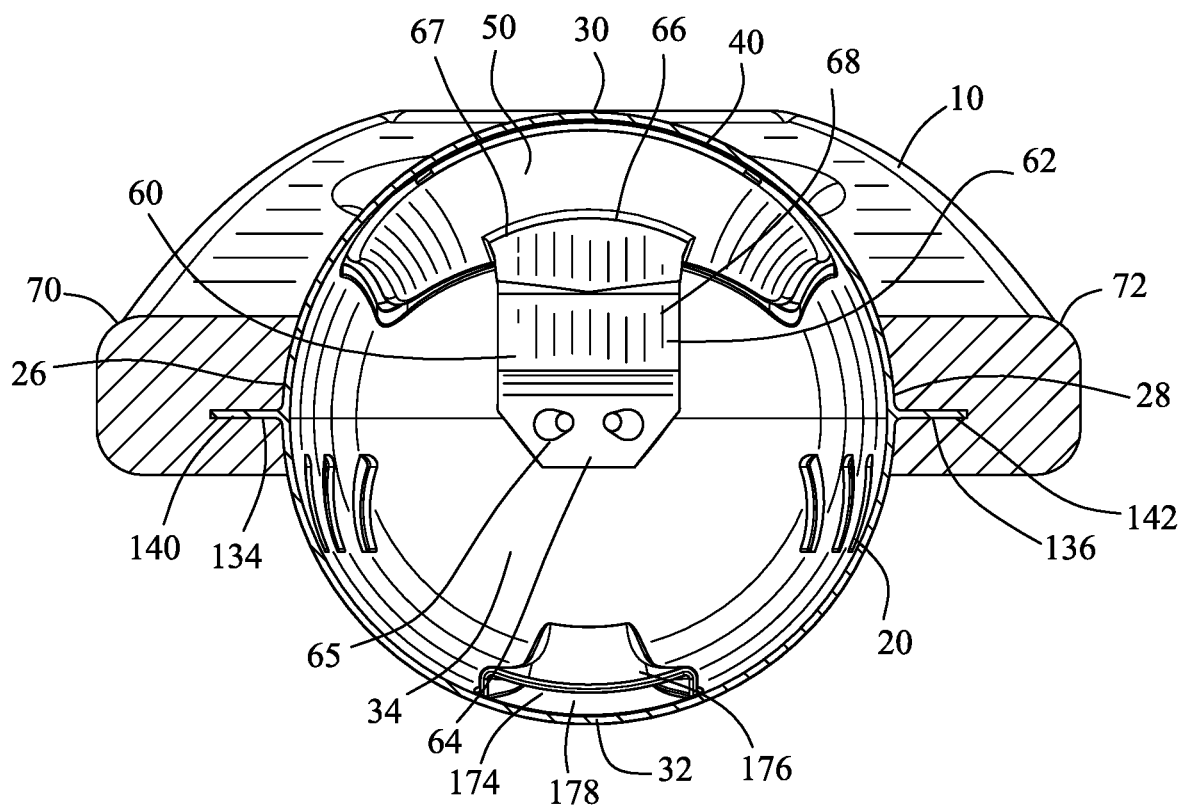
FIG. 10 is a sectional view along line 10-10 in FIG. 3.
Figure 11:
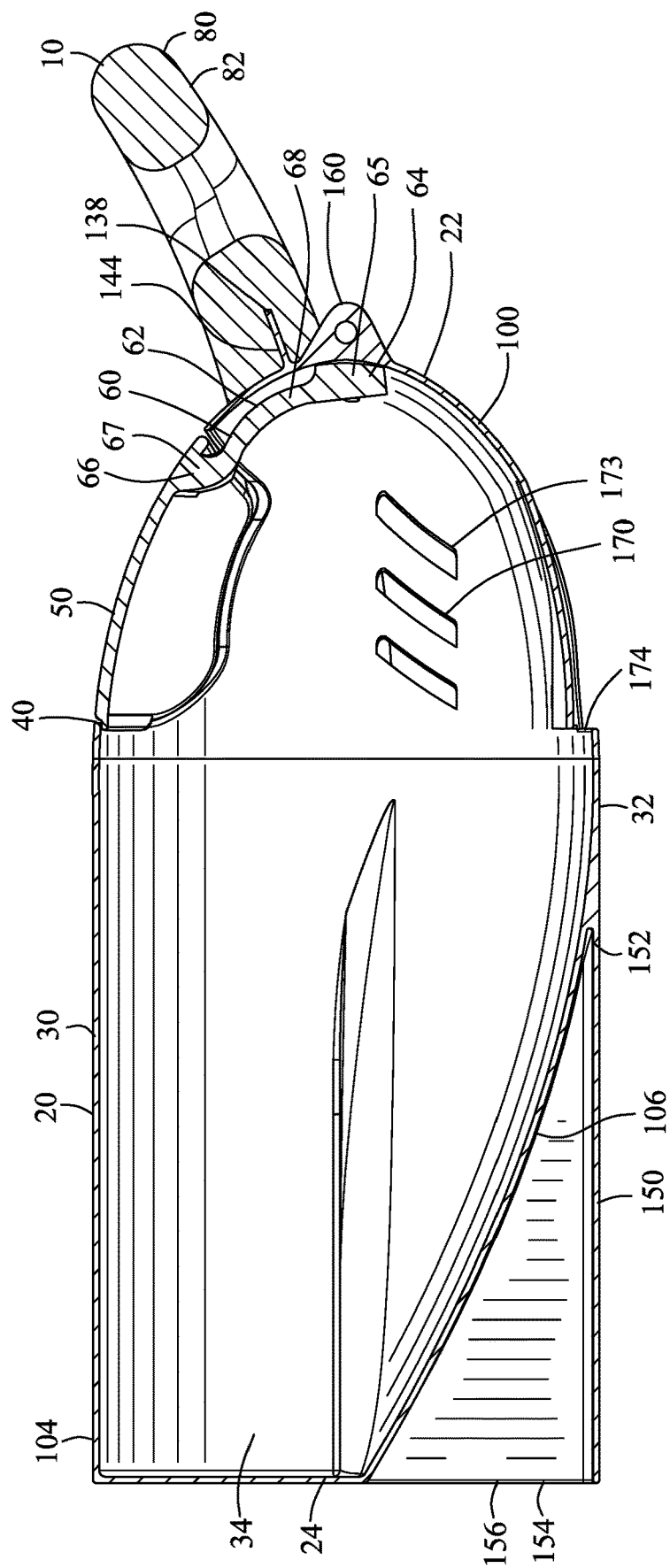
FIG. 11 is a sectional view along line 11-11 in FIG. 5.
Figure 12:
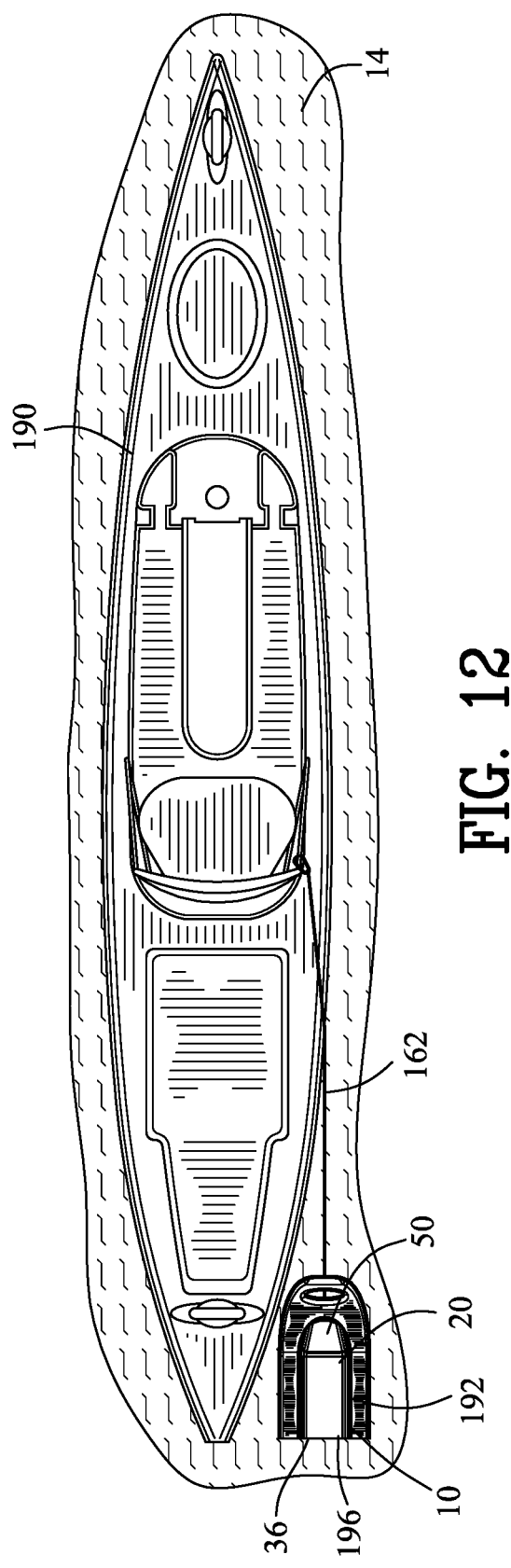
FIG. 12 is a view similar to FIG. 5 illustrating the marine containment device floating in a body of water and being towed adjacent to a vessel by a tether.
Figure 13:
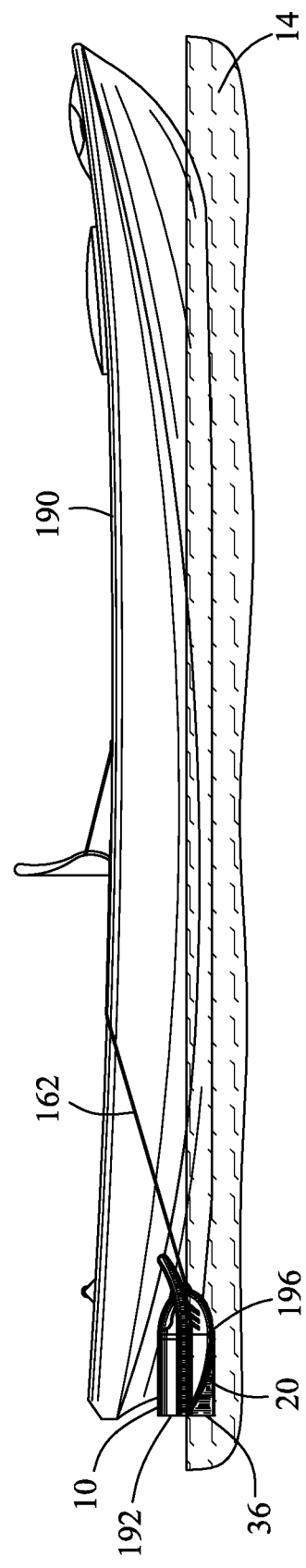
FIG. 13 is a side view of FIG. 12.
Figure 14:
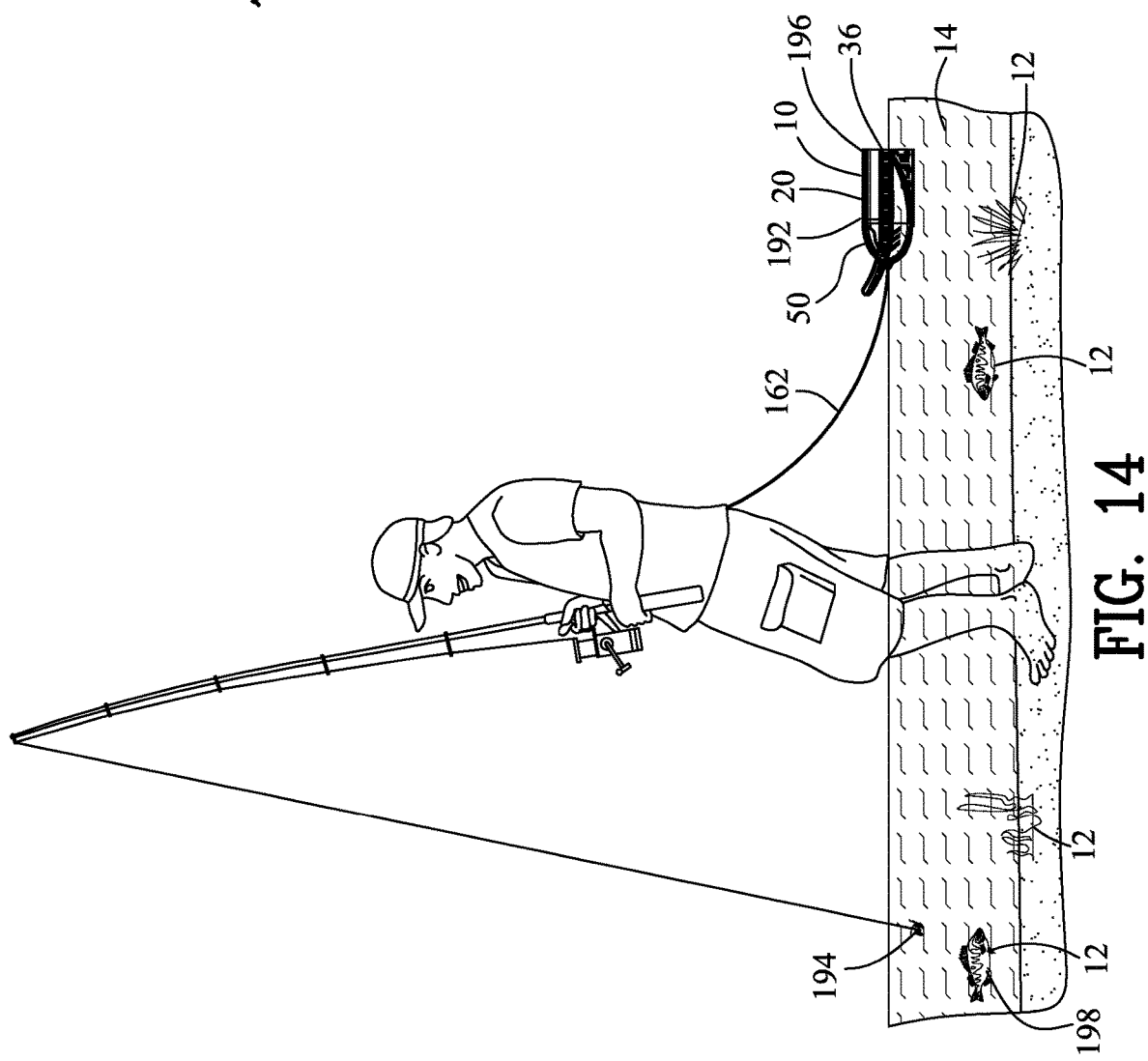
FIG. 14 is a view similar to FIG. 4 illustrating the marine containment device floating in a body of water and being towed behind an individual by a tether.

As shown in FIGS. 12 and 13, the marine containment device 10 is shown as coupled to a kayak 190 by the tether 162. As shown in FIG. 14, the marine containment device 10 is shown as coupled to an individual wading the body of water 14 by the tether 162. The marine containment device 10 may be utilized as a bait bucket 192 for containing marine species 12 used for bait 194. Alternatively, the marine containment device 10 may be utilized as a keeper fish bucket 196 for containing a keeper marine species 198 after capture within the body of water 14.

As shown in FIGS. 15, 18 and 19 the container 20 holds a portion of the body of water 14 and marine species 12 within the interior chamber 34 in the vertical position 38 for either transportation as shown in FIG. 15 or resting on the surface 16 as shown in FIGS. 18 and 19. The enlarged contact area between the surface 16 and the lower wall 32, first rear flotation plane 124, second rear flotation plane and the rear fin plane 156 assists in maintaining the container 20 in a vertical position 38 even when the individual applies a force to the closure door 50 for pivoting the closure door 50 within the interior chamber 34.

FIGS. 23-33 illustrate a second embodiment 200 of the marine containment device 10 for containing a marine species 12. The container 20 may be constructed by a blow molding process from constructed of a corrosive resistant material such as polyolefins—polyethylene and polypropylene (HDPE, LDPE, UHMW, PP), Polyvinyl Chlorides—PVC and CPVC, fluoropolymers (PTFE, FEP, PFA, PVDF, PCTFE, ECTFE, ETFE, etc). Alternatively, the container 20 may be constructed of stainless steel or other corrosive resistant materials The first body plate 134 coupled to the first side wall 26 includes an upper first plate side 210 and a lower first plate side 212. The second body plate 136 coupled to the second side wall 28 includes an upper second plate side 214 and a lower second plate side 216. A front body plate 220 is coupled to the front end 22. The front body plate 220 includes an upper front plate side 222 and a lower front plate side 224. The front body plate 220 may include a primary front body plate 226 and a secondary front body plate 228.

The first body plate 134 and the second body plate 136 define a side plate elevation 230 relative to the container 20. The front body plate 220 defines a front plate elevation 232 relative to the container 20. The side plate elevation 230 is a greater elevation 234 than the front plate elevation 232 for defining a stepped orientation 236 between the first body plate 134 and the second body plate 136 relative to the front body plate 220.

A general U-shape flotation body 250 abuts the first side wall 26, second side wall 28 and the front end 22. The general U-shape flotation body 250 defines an upper flotation side 252 and a lower flotation side 254. The general U-shape flotation body 250 may be constructed of integral-one-piece unit from a die cut foam 256 or other foam materials. The general U-shape flotation body 250 may include a general tear drop aperture 260 and a rear channel 262 for conforming to the container 20.

The upper flotation side 252 of the general U-shape flotation body 250 abuts the lower first plate side 212 of the first body plate 134, the upper flotation side 252 of the general U-shape flotation body 250 abuts the lower second plate side 216 of the second body plate 136, and the lower flotation side 254 of the general U-shape flotation body 250 abuts the upper front plate side 222 of the front body plate 220 for defining an staggered engagement 270.

The general U-shape flotation body 250 displacing a portion of the body of water 14 for providing a positive buoyancy while holding a portion of the body of water 14 and the marine species 12 within the interior chamber 34 when the container 20 defines a horizontal position 36 within the body of water 14. The rear end 24 defines a linear plane 132 for positioning on the surface 16 and maintaining the container 20 in a vertical position 38 while holding a portion of the body of water 14 and the marine species 12 within the interior chamber 34.

The stepped orientation 236 and the staggered engagement 270 defining an ascending arcuate platform 272 in the general U-shape flotation body 250 extending adjacent to the front end 22 of the container 20 for preventing the front end 22 of the container 20 descending into the body of water 14 during forward displacement of the container 20 within the body of water 14. In addition, the ascending arcuate platform 272 may be formed by an ascending arcuate portion 218 in the first body plate 134 and the second body plate 136. Furthermore, the ascending arcuate platform 272 may be formed by an ascending orientation 229 in the front body plate 220.

An eyelet plate 280 may be coupled to the front end 22. The eyelet plate 280 includes an eyelet 160 for receiving the tether 162. The eyelet plate 280 defines an upper eyelet plate side 282 and a lower eyelet plate side 284. The eyelet plate 280 defines an eyelet elevation 286. The eyelet elevation 286 has a generally equivalent elevation 288 with the front plate elevation 232 for defining a generally parallel orientation 290 between the eyelet plate 280 relative to the front body plate 220. The generally equivalent elevation defines the ascending arcuate platform 272 in the general U-shape flotation body 250 extending adjacent to the front end 22 of the container 20 for preventing the front end 22 of the container 20 descending into the body of water 14 during forward displacement of the container 20 within the body of water 14.

The first elongated shoulder 110 extends inwardly from the first side wall 26. The second elongated shoulder 112 extending inwardly from the second side wall 28. The container fin 150 is coupled to the lower wall 32 and between the first elongated shoulder 110 and the second elongated shoulder 112 for promoting a linear direction of the container 20 during forward displacement of the container 20 within the body of water 14. The container fin 150 includes a front fin edge 152 and a rear fin edge 154. The rear fin edge 154 defines a rear fin plane 156.

The rear fin plane 156 is aligned with the linear plane 132 for creating an extending plane 130 for positioning on the surface 16 and maintaining the container 20 in a vertical position 38 while holding a portion of the body of water 14 and the marine species 12 within the interior chamber 34. The first elongated shoulder 110 is aligned with the first body plate 134 for abutting the general U-shape flotation body 250 with the first elongated shoulder 110. Similarly, the second elongated shoulder 112 is aligned with the second body plate 136 for abutting the general U-shape flotation body 250 with the second elongated shoulder 112.

The general U-shape flotation body 250 defines a first rear flotation edge 120 and a second rear flotation edge 122. The first rear flotation edge 120 defines a first rear flotation plane 124. The second rear flotation edge 122 defines a second rear flotation plane 126. The first rear flotation plane 124 and the second rear flotation plane 126 align with the linear plane 132 for creating an extending plane 130 for positioning on the surface 16 and maintaining the container 20 in a vertical position 38 while holding a portion of the body of water 14 and the marine species 12 within the interior chamber 34. The general U-shape flotation body 250 may be coupled to the first body plate 134, the second body plate 136 and the front body plate 220 by plastic fasteners, plastic rivets 292, gluing or other fastening means.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A marine containment device for containing a marine species, the marine containment device supportable by a body of water or by a rigid surface, the marine containment device, comprising:
    a container having a front end, a rear end, a first side wall, a second side wall, an upper wall and a lower wall;
    said container defining an interior chamber;
    an aperture in said container for inputting and outputting the marine species relative to said interior chamber;
    a closure door for closing said aperture;
    a hinge pivotally coupling said closure door with said container;
    a first elongated shoulder extending inwardly from said first side wall;
    a second elongated shoulder extending inwardly from said second side wall;
    a general U-shape flotation body abutting said first side wall, second side wall and said front end;
    said general U-shape flotation body defining an upper flotation side and a lower flotation side;
    said upper flotation side of said general U-shape flotation body abutting said first elongated shoulder and said second elongated shoulder;
    said general U-shape flotation body displacing a portion of the body of water for providing a positive buoyancy while holding a portion of the body of water and the marine species within said interior chamber when said container defines a horizontal position within said body of water; and
    said rear end defining a linear plane for positioning on the surface and maintaining said container in a vertical position while holding a portion of the body of water and the marine species within said interior chamber.

2. A marine containment device for containing a marine species as set forth in claim 1, further including an eyelet plate coupled to said front end;
    said eyelet plate defining an upper eyelet plate side and a lower eyelet plate side;
    said eyelet plate defining an ascending arcuate platform in said general U-shape flotation body for preventing said front end of said container descending into the body of water during forward displacement of said container within the body of water.

3. A marine containment device for containing a marine species as set forth in claim 1, further including a container fin coupled to said lower wall and between said first elongated shoulder and said second elongated shoulder for promoting a linear direction of said container during forward displacement of the container within the body of water; and said container fin and said rear end defining a rear plane for positioning on the surface and maintaining said container in a vertical position while holding a portion of the body of water and the marine species within said interior chamber.

4. A marine containment device for containing a marine species, the marine containment device supportable by a body of water or by a rigid surface, the marine containment device, comprising:
    a container having a front end, a rear end, a first side wall, a second side wall, an upper wall and a lower wall;
    said container defining an interior chamber;
    an aperture in said container for inputting and outputting the marine species relative to said interior chamber;
    a closure door for closing said aperture;
    a hinge pivotally coupling said closure door with said container;
    a first body plate coupled to said first side wall;
    said first body plate defining an upper first plate side and a lower first plate side;
    a second body plate coupled to said second side wall;
    said second body plate defining an upper second plate side and a lower second plate side;
    a front body plate coupled to said front end;
    said front body plate defining an upper front plate side and a lower front plate side;
    said first body plate and said second body plate defining a side plate elevation;
    said front body plate defining a front plate elevation;
    said side plate elevation being greater than said front plate elevation for defining a stepped orientation between said first body plate and said second body plate relative to said front body plate;
    a general U-shape flotation body abutting said first side wall, second side wall and said front end;
    said general U-shape flotation body defining an upper flotation side and a lower flotation side;
    said upper flotation side of said general U-shape flotation body abutting said lower first plate side of said first body plate, said upper flotation side of said general U-shape flotation body abutting said lower second plate side of said second body plate, and said lower flotation side of said general U-shape flotation body abutting said upper front plate side for defining a staggered engagement;
    said general U-shape flotation body displacing a portion of the body of water for providing a positive buoyancy while holding a portion of the body of water and the marine species within said interior chamber when said container defines a horizontal position within said body of water;
    said rear end defining a linear plane for positioning on the surface and maintaining said container in a vertical position while holding a portion of the body of water and the marine species within said interior chamber; and
    said stepped orientation and said staggered engagement defining an ascending arcuate platform in said general U-shape flotation body extending adjacent to said front end of said container for preventing said front end of said container descending into the body of water during forward displacement of said container within the body of water.

5. A marine containment device for containing a marine species as set forth in claim 4, further including an eyelet plate coupled to said front end;

said eyelet plate defining an upper eyelet plate side and a lower eyelet plate side;

said eyelet plate defining an eyelet elevation;

said eyelet elevation having a generally equivalent elevation with said front plate elevation for defining a generally parallel orientation between said eyelet plate relative to said front body plate; and said generally equivalent elevation defining said ascending arcuate platform in said general U-shape flotation body.

6. A marine containment device for containing a marine species as set forth in claim 4, further including a first elongated shoulder extending inwardly from said first side wall;

a second elongated shoulder extending inwardly from said second side wall;

a container fin coupled to said lower wall and between said first elongated shoulder and said second elongated shoulder for promoting a linear direction of said container during forward displacement of the container within the body of water;

said container fin includes a front fin edge and a rear fin edge;

said rear fin edge defining a rear fin plane;

said rear fin plane aligned with said linear plane for creating an extending plane for positioning on the surface and maintaining said container in a vertical position while holding a portion of the body of water and the marine species within said interior chamber;

said first elongated shoulder aligned with said first body plate for abutting said general U-shape flotation body with said first elongated shoulder;

said second elongated shoulder aligned with said second body plate for abutting said general U-shape flotation body with said second elongated shoulder;

said general U-shape flotation body defines a first rear flotation edge and a second rear flotation edge;

said first rear flotation edge defining a first rear flotation plane;

said second rear flotation edge defining a second rear flotation plane; and said first rear flotation plane and said second rear flotation plane aligned with said linear plane for creating an extending plane for positioning on the surface and maintaining said container in a vertical position while holding a portion of the body of water and the marine species within said interior chamber.

* * * * *